(12) United States Patent
Moriuchi et al.

(10) Patent No.: US 10,914,960 B2
(45) Date of Patent: Feb. 9, 2021

(54) IMAGING APPARATUS AND AUTOMATIC CONTROL SYSTEM

(71) Applicant: KABUSHIKI KAISHA TOSHIBA, Tokyo (JP)

(72) Inventors: Yusuke Moriuchi, Tokyo (JP); Nao Mishima, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/692,827

(22) Filed: Aug. 31, 2017

(65) Prior Publication Data

US 2018/0136477 A1 May 17, 2018

(30) Foreign Application Priority Data

Nov. 11, 2016 (JP) .................................. 2016-220635

(51) Int. Cl.

| | | |
|---|---|---|
| *G02B 27/09* | (2006.01) | |
| *G06T 7/571* | (2017.01) | |
| *G02B 5/20* | (2006.01) | |
| *H04N 9/04* | (2006.01) | |
| *G02B 5/23* | (2006.01) | |
| *H04N 5/225* | (2006.01) | |

(52) U.S. Cl.
CPC ............ *G02B 27/0961* (2013.01); *G02B 5/20* (2013.01); *G02B 5/201* (2013.01); *G02B 5/23* (2013.01); *G06T 7/571* (2017.01); *H04N 9/0455* (2018.08); *G06T 2207/10024* (2013.01); *H04N 5/2254* (2013.01)

(58) Field of Classification Search
CPC ...... G02B 27/0961; G02B 5/201; G02B 5/23; G06T 7/571; G06T 2207/10024; H04N 9/045; H04N 5/2254
USPC ........ 359/885, 891, 892, 580, 581, 582, 589, 359/590
See application file for complete search history.

(56) References Cited

U.S. PATENT DOCUMENTS

| | | | |
|---|---|---|---|
| 6,597,409 B1 * | 7/2003 | Shioya ................. | H04N 9/3114 348/742 |
| 2005/0146634 A1 * | 7/2005 | Silverstein ........... | H04N 5/2254 348/360 |

(Continued)

FOREIGN PATENT DOCUMENTS

| | | |
|---|---|---|
| CN | 103636199 A | 3/2014 |
| JP | 2013-17138 | 1/2013 |

(Continued)

*Primary Examiner* — Jade R Chwasz
(74) *Attorney, Agent, or Firm* — Finnegan, Henderson, Farabow, Garrett & Dunner, L.L.P.

(57) ABSTRACT

An imaging apparatus includes a filter configured to transmit light and an image sensor configured to generate an image according to the light. The filter includes first to fourth filter regions. The first filter region transmits light of a first wavelength region, and does not transmit light of a second wavelength region. The second filter region does not transmit the light of the first wavelength region and transmits the light of the second wavelength region. The third, filter region does not transmit the light of the first, wavelength region and does not transmit the light of the second wavelength region. The fourth filter region transmits the light of the first wavelength region and transmits the light of the second wavelength region.

17 Claims, 22 Drawing Sheets

(56) References Cited

U.S. PATENT DOCUMENTS

| | | | | |
|---|---|---|---|---|
| 2010/0066854 A1* | 3/2010 | Mather | ............... | G02B 5/005 348/222.1 |
| 2013/0342661 A1* | 12/2013 | Ishii | ............... | H04N 9/045 348/49 |
| 2015/0156430 A1* | 6/2015 | Ishiga | ............... | G06T 5/002 348/241 |
| 2016/0154152 A1 | 6/2016 | Moriuchi et al. | | |
| 2017/0054910 A1 | 2/2017 | Moriuchi et al. | | |
| 2017/0353710 A1 | 12/2017 | Sasaki et al. | | |

FOREIGN PATENT DOCUMENTS

| | | |
|---|---|---|
| JP | 2016-102733 | 6/2016 |
| JP | 2017-40642 | 2/2017 |
| JP | 2017-220780 | 12/2017 |
| WO | WO 2013/005489 | 1/2013 |
| WO | WO 2013/175816 | 11/2013 |
| WO | WO 2016/003253 | 1/2016 |

\* cited by examiner

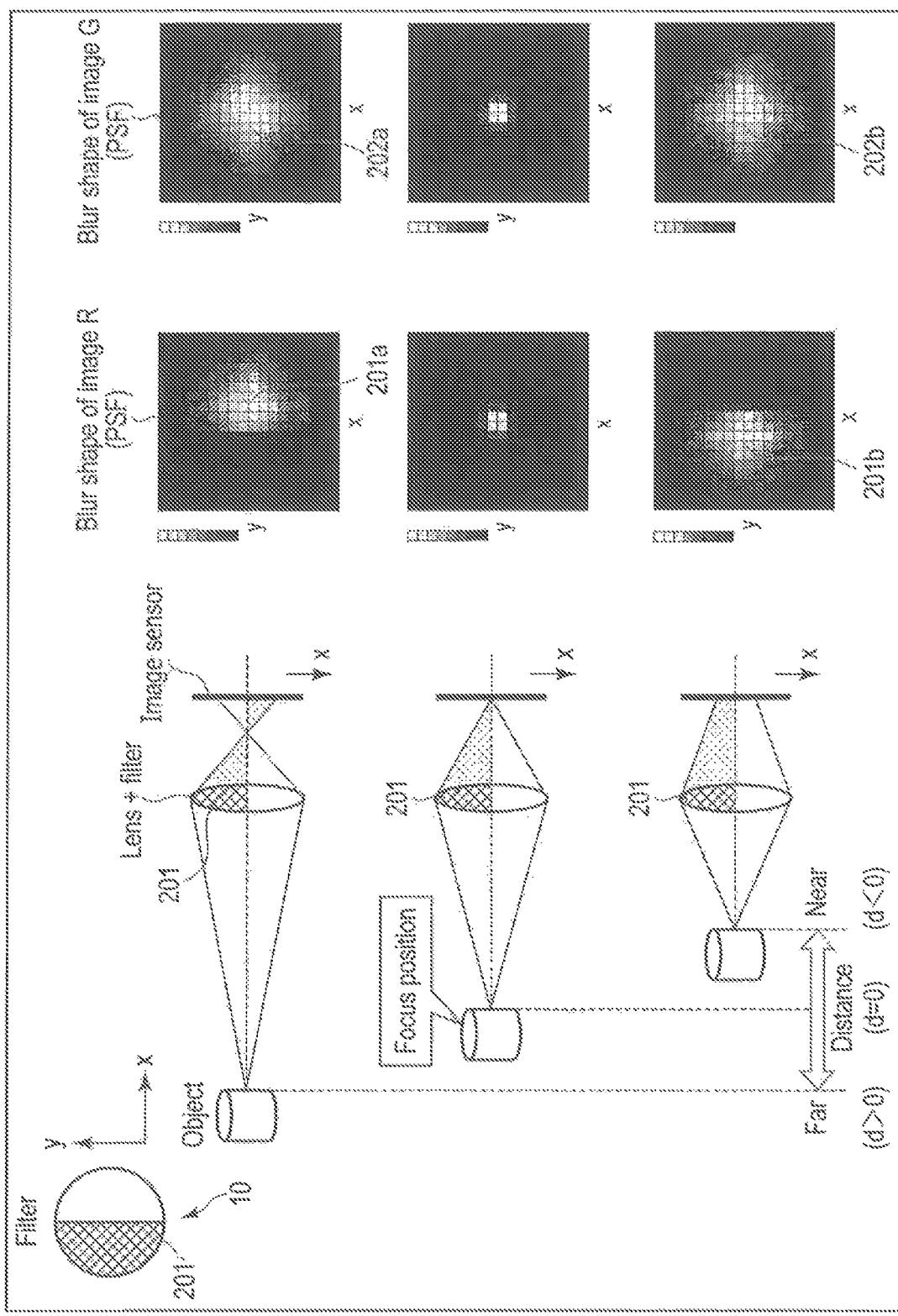
F I G. 6

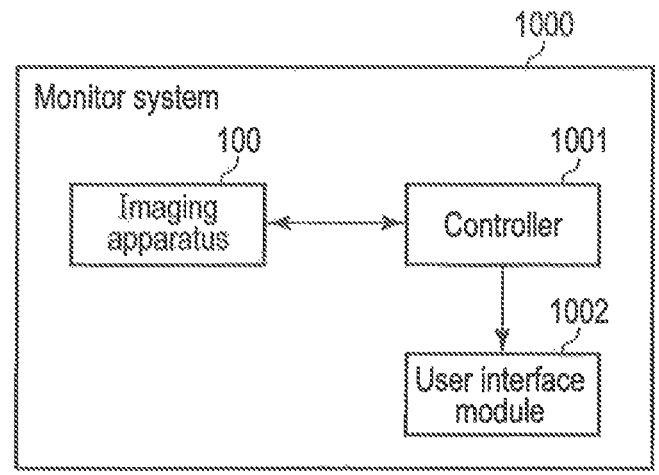
F I G. 21
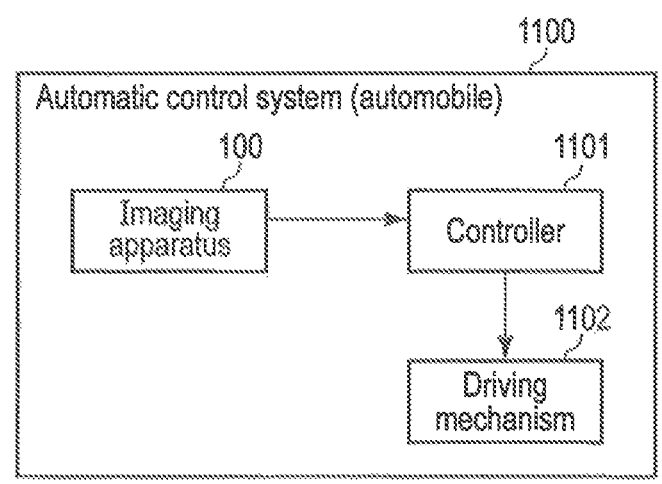
F I G. 23

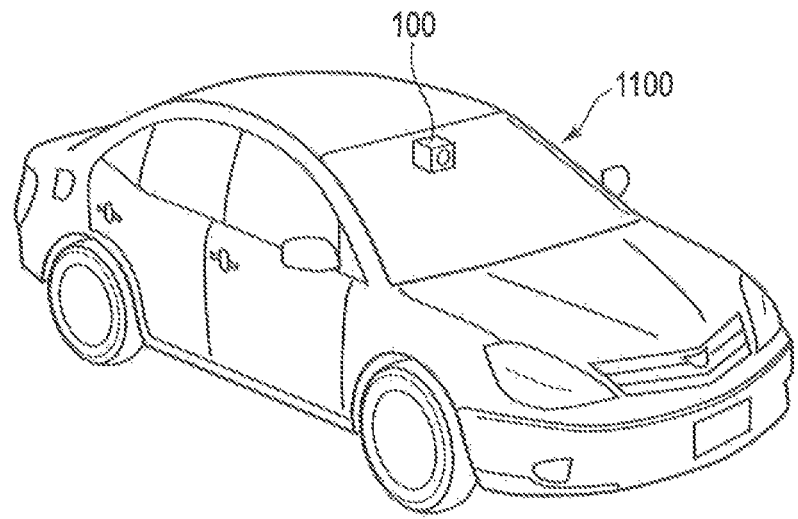
F I G. 24
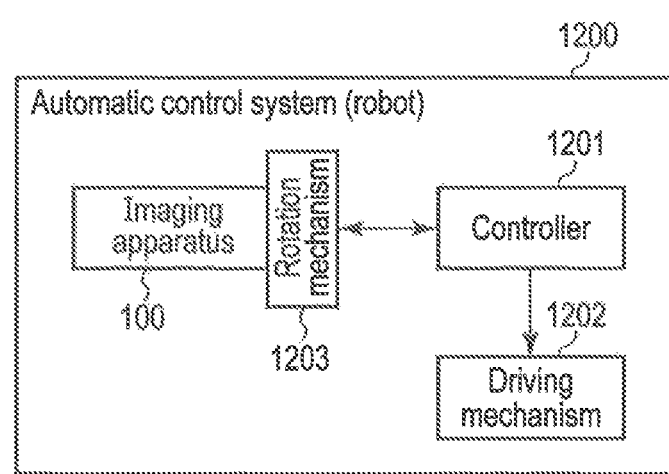
F I G. 25

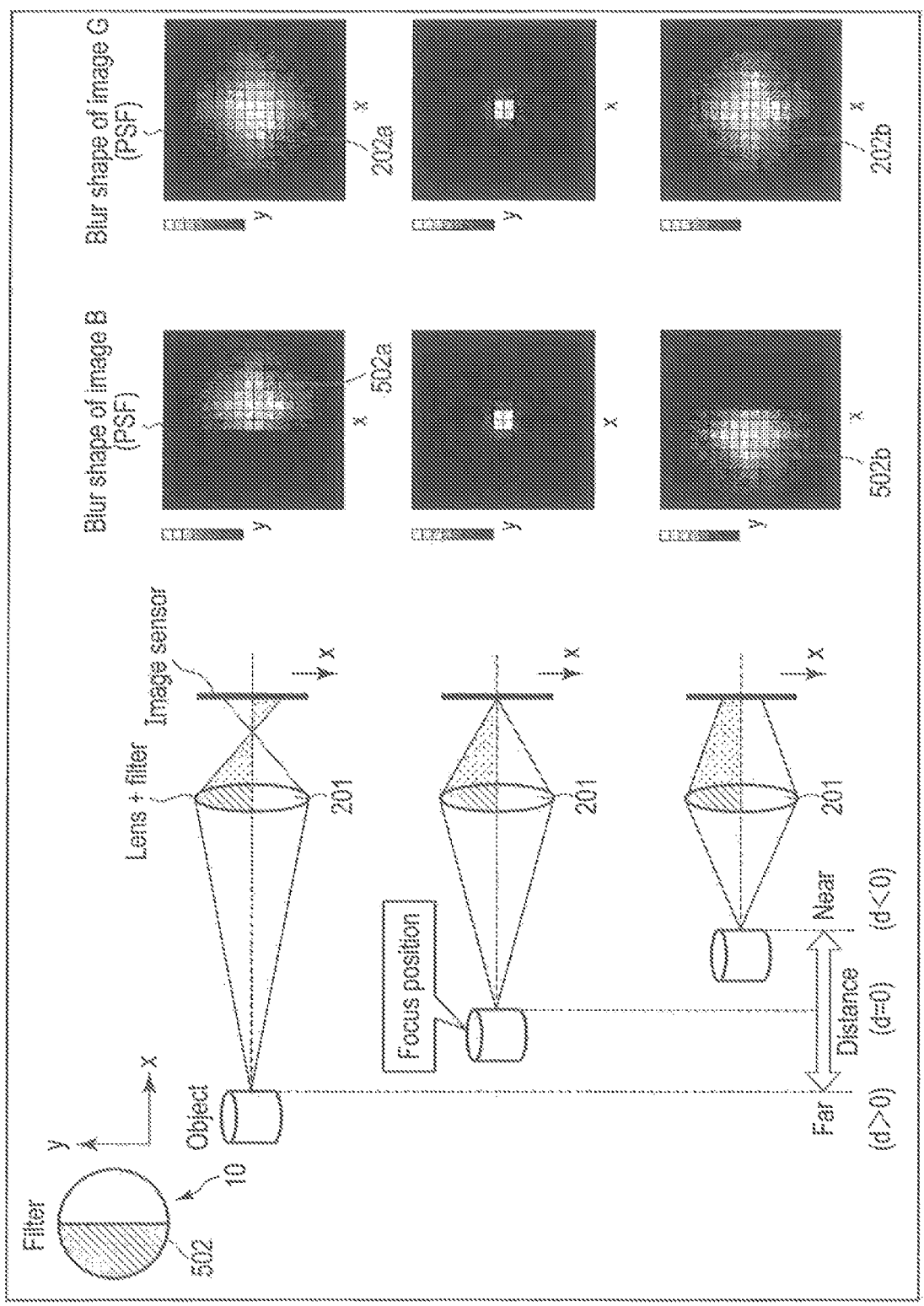
F I G. 31

IMAGING APPARATUS AND AUTOMATIC CONTROL SYSTEM

CROSS-REFERENCE TO RELATED APPLICATIONS

This application is based upon and claims the benefit of priority from Japanese Patent Application No. 2016-220635, filed Nov. 11, 2016, the entire contents of which are incorporated herein by reference.

FIELD

Embodiments described herein relate generally to an imaging apparatus and an automatic control system.

BACKGROUND

In general, there is known a technique of acquiring distance information indicating a distance front an imaging apparatus to an object based on an image of a subject (hereinafter referred to as captured image) captured by an imaging apparatus (camera).

As an example of such a technique, it is known to calculate a distance to an object by taking pictures of art object (object) from different directions with two cameras which is called a stereo camera, for example.

However, in the above stereo camera, it is necessary to provide two cameras with a predetermined interval, so it is difficult to reduce the size of the stereo camera.

In addition to the stereo camera, there are various techniques for acquiring distance information based on captured images, but no technique has ever been established to acquire distance information with high precision in a compact and low cost imaging apparatus.

BRIEF DESCRIPTION OF THE DRAWINGS

FIG. 6 is a diagram for conceptually explaining an image R generated by the first sensor.

FIG. 21 is a block diagram showing an example of a functional configuration of the monitor system.

FIG. 23 is a block diagram showing an example of a functional configuration of an automatic control system for controlling the operation of an automobile.

FIG. 24 is a diagram showing an example of an imaging apparatus installed in an automobile.

FIG. 25 is a diagram showing an example of a functional configuration of an automatic control system for controlling the operation of a robot.

FIG. 23 is a diagram for explaining an example of a filter provided in the opening portion of the imaging apparatus according to the second embodiment.

FIG. 31 is a diagram for conceptually explaining the image B generated by the third sensor.

DETAILED DESCRIPTION

In general, according to one embodiment, an imaging apparatus includes a filter configured to transmit light and an image sensor configured to generate an image according to the light that has been transmitted by the filter. The filter includes first to fourth filter regions. The first filter region which transmits, of the incident light, light of a first wavelength region, and does not transmit light of a second wavelength region of which wavelength is different from that of the first wavelength region. The second filter region which does not transmit the light of the first wavelength region and transmits the light of the second wavelength region. The third filter region which does not transmit the light of the first wavelength region and does not transmit the light of the second wavelength region. The fourth filter region which transmits the light of the first wavelength region and transmits the light of the second wavelength region.

Various embodiments will be described hereinafter with reference to the accompanying drawings.

First Embodiment

Figure 1:
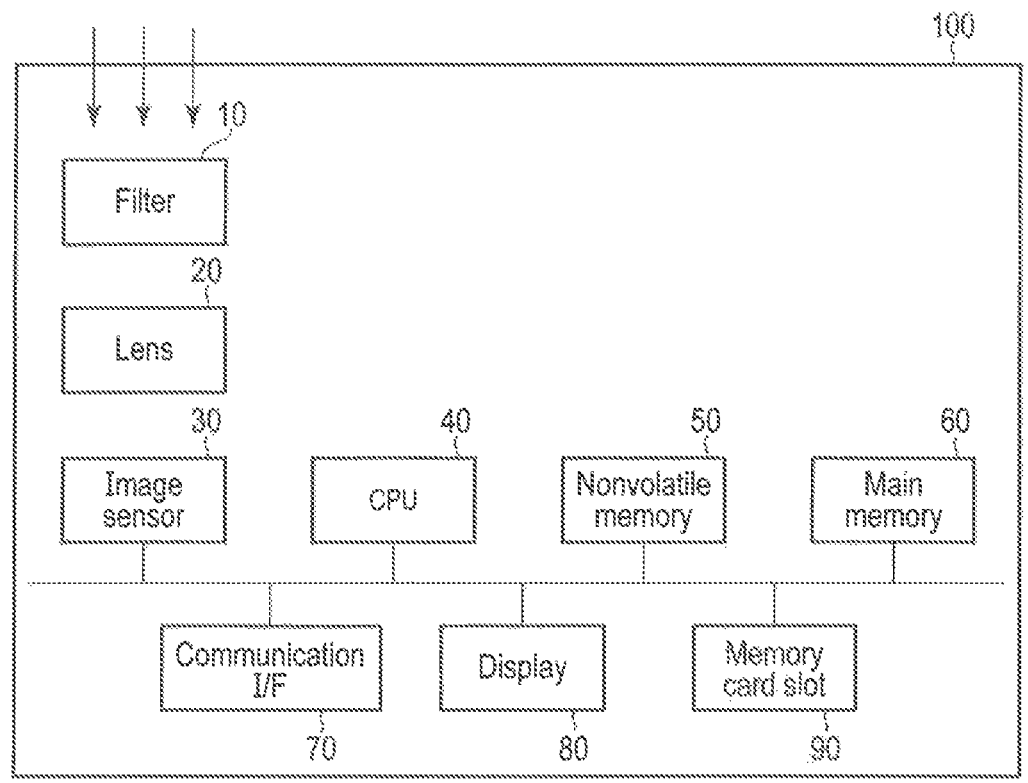
FIG. 1 is a block diagram showing an example of a hardware configuration of an imaging apparatus according to a first embodiment.

First, the first embodiment will be explained. FIG. 1 is a block diagram showing an example of a hardware configuration of an imaging apparatus according to this embodiment. The imaging apparatus according to the present embodiment can be incorporated in, for example, a camera, a mobile phone having a camera function, a portable information terminal such as a smartphone and a PDA (Personal Digital Assistant, Personal Data Assistant), a personal computer having a camera function, or an embedded system embedded in various kinds of electronic devices.

As shown in FIG. 1, an imaging apparatus 100 includes a filter 10, a lens 20, an image sensor 30, an image processor, and a storage. The image processor includes, for example, a circuit such as the CPU 40. The storage includes, for example, a nonvolatile memory 50 and a main memory 60. The imaging apparatus 100 may further include a communication I/F 70, a display 80, a memory card slot 90, and the like. For example, the image sensor 30, the CPU 40, the nonvolatile memory 50, the main memory 60, the communication I/F 70, the display 80, and the memory card slot 90 can be interconnected via a bus.

For example, the filter 10 is provided in the opening portion of the imaging apparatus 100, and transmits incident light (light reflected from the object) to capture an image of the object represented by the arrow in FIG. 1.

In the case where the filter 10 is provided in the opening portion of the imaging apparatus 100, the lens 20 transmits the light having passed through the filter 10 so as to condense the light.

The light transmitted through the filter 10 and the lens 20 reaches the image sensor 30 and is received by the image sensor 30. The image sensor 30 generates an image by converting received light into an electric signal (photoelectric conversion). In the following description, the image generated by the image sensor 30 will be referred to as a captured image for the sake of convenience.

For example, the image sensor 30 is realized by a charge coupled device (CCD) image sensor and a complementary metal oxide semiconductor (CMOS) image sensor. The image sensor 30 includes a sensor (sensor R) that detects light of a wavelength region of red (R), a sensor (sensor G) that detects light of a wavelength region of green (G), and a sensor (sensor B) that detects light of a wavelength region of green (B). Each sensor receives the light of the corresponding wavelength region, and generates images (image R, image G, and image B) corresponding to the wavelength regions (color components). More specifically, the above captured image includes the image R, the image G, and the image B.

In the explanation about FIG. 1, the filter 10 is provided in the opening portion of the imaging apparatus 100. However, the filter 10 may be provided inside of the lens 20, or may be provided between the lens 20 and the image sensor 30. More specifically, the filter 10 may be provided at a position where the image sensor 30 can receive the light transmitted through the filter 10 and generate an image.

The CPU 40 is a hardware processor that controls the operation of the imaging apparatus 100 in an integrated manner. More specifically, the CPU 40 executes various programs (software) loaded from the nonvolatile memory 50 to the main memory 60. As the nonvolatile memory 50, for example, a rewritable storage device such as an HDD (Hard Disk Drive) and a NAND type flash memory can be used. As the main memory 60, for example, a RAM (Random Access Memory) or the like may be used.

The communication I/F 70 is an interface for controlling, for example, communication with an external device. The display 80 includes a liquid crystal display, a touch screen display, and the like. The memory card slot 90 is configured so that a portable storage medium such as SD memory card and an SDHC memory card can be inserted in the memory card slot 90 to be used. When the storage medium is inserted in the memory card slot 90, writing and reading of data to and from the storage medium can be executed. The data is, for example, image data and distance information to be described later.

In FIG. 1, it has been explained that all of the filter 10, the lens 20, the image sensor 30, the CPU 40, the nonvolatile memory 50, the main memory 60, the communication I/F 70, the display 80, and the memory card slot 90 are provided in the imaging apparatus 100, but in the present embodiment, for example, the imaging apparatus 100 may be configured so that at least one of components other than the filter 10, the lens 20, and the image sensor 30 is not provided in the imaging apparatus 100.

Subsequently, an example of a filter 10 provided in the opening portion of the imaging apparatus 100 according to the present embodiment will be described with reference to FIG. 2.

In the present embodiment, the filter 10 is a color filter and transmits light of a specific wavelength band. For example, all the regions of the filter 10 are composed of a plurality of regions which do not overlap each other. In the example shown in FIG. 2, the filter 10 includes a first filter region 11, a second filter region 12, a third filter region 13, and a fourth filter region 14.

Figure 2:
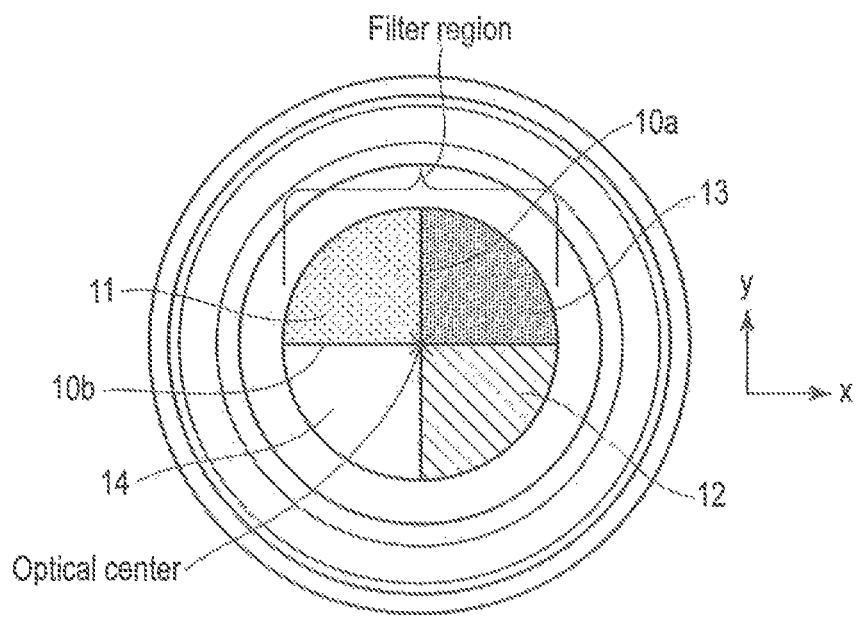
FIG. 2 is a view for explaining an example of a filter provided in an opening portion of the imaging apparatus.

As shown in FIG. 2, for example, first to fourth filter regions 11 to 14 have a shape that is non-point symmetrical with respect to the optical center of the lens 20. The first to fourth filter regions 11 to 14 are formed by the outer edge of the filter 10 and at least two or more lines inside the outer edge and intersecting with each other. In the example shown in FIG. 2, for example, the first to fourth filter regions 11 to 14 has a fan shape of the same size which is formed by two lines 10a and 10b that pass through the center of a shape (for example, a circle) of the opening portion (i.e., the filter 10) of the imaging apparatus 100 and that intersect with each other. For example, the center of the shape of the opening portion is the optical center of the lens 20, For example, the two lines 10a and 10b are orthogonal to each other. The two lines are, for example, line segments. For example, as seen from the object side captured by the imaging apparatus 100, the first filter region 11 is positioned so as to be at the left side of the third filter region 13 and to be adjacent to the upper side of the fourth filter region 14, and is positioned to face the second filter region 12. More specifically, as shown in FIG. 2, the filter 10 according to the present embodiment is arranged so that the first filter region 11 is located at the upper left of filter 10, the second filter region 12 is located at the lower right of the filter 10, the third filter region 13 is located at the upper right of filter 10, and the fourth filter region 14 is located at the lower left of the filter 10. The First filter region 11 and the second filter region 12 face each other. The third filter region 13 and the fourth filter region 14 face each other. The first filter region 11, the second filter region 12, the third filter region 13, and the fourth filter region 14 are arranged in this order along the periphery of the opening portion.

The first filter region 11 transmits the light of the first wavelength region included in the light incident on the imaging apparatus 100 (hereinafter simply referred to as incident light) in order to capture an image of the object. In addition, the first filter region 11 does not transmit light of a second wavelength region having a different wavelength from the first wavelength region in the incident light. For example, the first filter region 11 shields the light of second wavelength region by reflecting the light of second wavelength region. For example, the first filter region 11 attenuates the light of the second wavelength region by absorbing the light of the second wavelength region. In this case, the first wavelength region contains the red wavelength region, and the second wavelength region contains the blue wavelength region. For example, the first filter region 11 is constituted by a "yellow (Y) filter" that transmits light of a red wavelength region and light of a green wavelength region (third wavelength region) and does not transmit light of a blue wavelength region.

The second filter region 12 does not transmit the light of the first wavelength region of the incident light and transmits the light of the second wavelength region. As described above, where the first wavelength region is the red wavelength region and the second wavelength region is the blue wavelength region, the second filter region 12 is constituted by a "cyan (C) filter" that transmits light of the green wavelength region and light of the blue wavelength region and does not transmit the light of the red wavelength region.

The third filter region 13 does not transmit the light of the first wavelength region and the light of the second wavelength region of the incident light. As described above, where the first wavelength region is the red wavelength region and the second wavelength region is the blue wavelength region, the third filter region 13 is constituted by a "green (G) filter" that transmits light of the third wavelength region (for example, green wavelength region) and does not transmit light of the red wavelength region and light of the blue wavelength region.

The fourth filter region 14 transmits the lights of the first and the second wavelength regions of the incident light. As described above, where the first wavelength region is the red wavelength region and the second wavelength region is the blue wavelength region, the fourth filter region 14 is constituted by a "transparent filter" transmitting the light of the red wavelength region, the light of the green wavelength region, and the light of the blue wavelength region (i.e., transmitting all of the colors of the incident light). Because of the configuration in which the filter 10 is provided in the opening portion, the fourth filter region 14 is assumed to be constituted by the "transparent filter". Alternatively, the filter (transparent filter) may not be provided in the fourth filter region 14.

Figure 3:
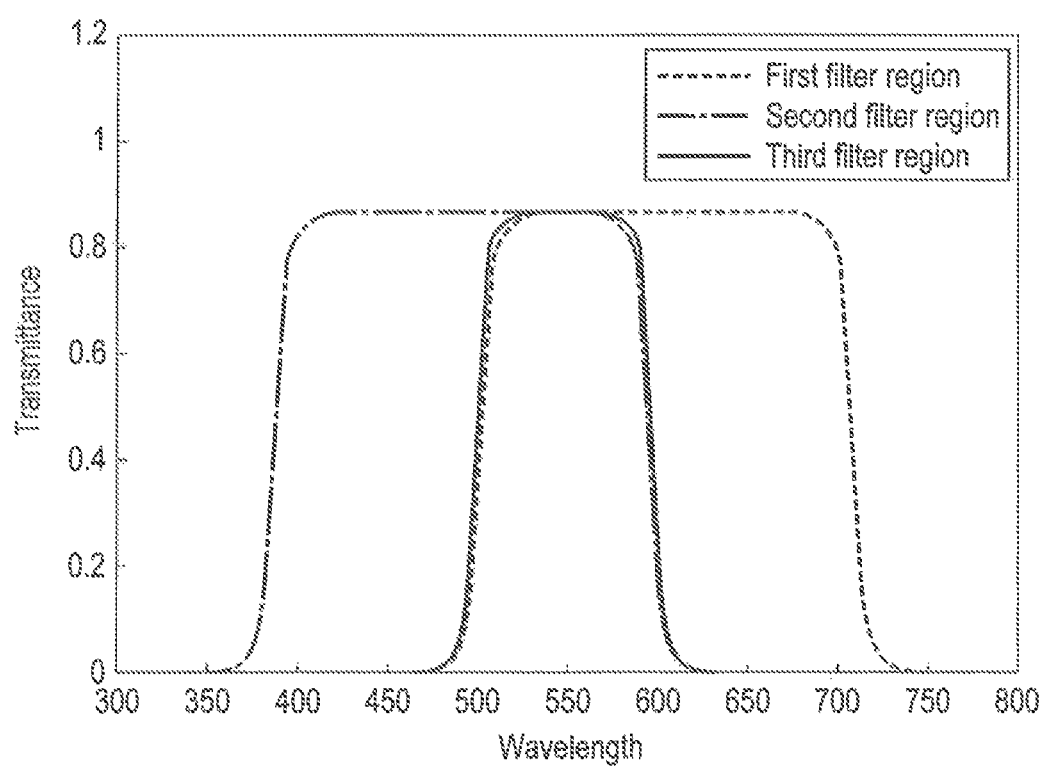
FIG. 3 is a view showing an example of the transmittance characteristics of first to third filter regions.

Hereinafter, FIG. 3 shows an example of the transmittance characteristics of the first to third filter regions 11 to 13 described above. In FIG. 3, the first filter region 11 transmits the lights of the red and green wavelength regions. The second filter region 12 passes through the lights of the green and blue wavelength regions. Furthermore, the third filter region 13 transmits the light of the green wavelength region.

Although the transmittance characteristics of the fourth filter region 14 are omitted in FIG. 3, the fourth filter region 14 is a "transparent filter" transmitting the lights of the red, green, and blue wavelength region. As described above, in the present embodiment, the filter 10 is configured so that the transmittance characteristics of the first to fourth filter regions 11 to 14 are different.

In the present embodiment, "to transmit" means that the light of the corresponding wavelength region is transmitted with a high transmittance and the attenuation (more specifically, a decrease in the amount of light) of the light of the wavelength region is extremely small. More specifically, "to transmit" includes not only a case where all the lights of the corresponding wavelength region are transmitted but also a case where the wavelength region is mainly transmitted.

"Not to transmit" is to shield the light of the corresponding wavelength region, and for example, it means that the light of the wavelength region is transmitted with a low transmittance, and the attenuation of the light of the wavelength region by the filter region is extremely large. More specifically, "not to transmit" includes not only a case where the light of the corresponding wavelength region is not transmitted but also a case where the wavelength region is mainly not transmitted.

More specifically, the first filter region 11 is configured to transmit the light of the red and green wavelength regions and shield the light of the blue wavelength region, but the first filter region 11 does not have to be one that transmits all of the lights of the red and green wavelength regions, and the first filter region 11 does not have to be one that does not transmit all of the light of the blue wavelength region. This is applicable to other filter regions. In other words, for example, the transmittance characteristics of the first to fourth filter regions 11 to 14 may be set so that an image R can be generated based on the light of the red wavelength region from the light transmitted through the first filter region 11 and the fourth filter region 14, an image G can be generated based on the light of the green wavelength region from the light transmitted through the first to fourth filter regions 11 to 14, and an image B can be generated based on the light of the blue wavelength region from the light transmitted through the second filter region 12 and the fourth filter region 14.

The imaging apparatus 100 according to the present embodiment has a function for obtaining information (hereinafter referred to as distance information) indicating a distance (depth) from the imaging apparatus 100 to the object based on an image obtained by capturing an image of any given object via the filter 10 explained above.

Figure 4:
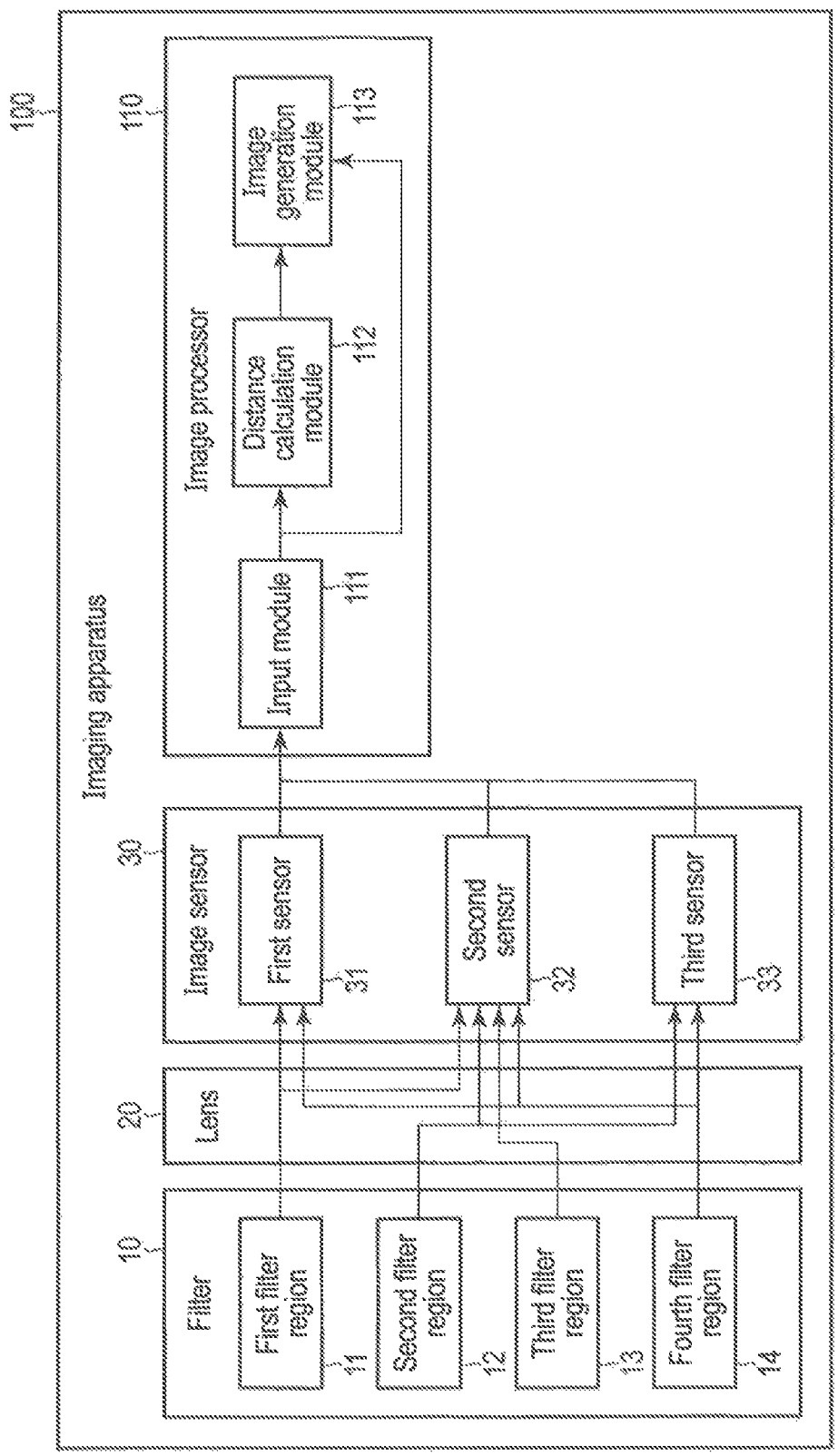
FIG. 4 is a diagram showing an example of a functional configuration of the imaging apparatus.

FIG. 4 shows an example of a functional configuration of an imaging apparatus 100 according to the present embodiment. As shown in FIG. 4, the imaging apparatus 100 includes an image processor 110 as a functional constituent unit in addition to the filter 10, the lens 20, and the image sensor 30 explained above. In the present embodiment, a part or all of functions of the image processor 110 is realized by causing a computer such as the CPU 40 (the image processor 110) to execute a program, and more specifically, realized by software. The program to be executed by the computer may be stored in a computer readable storage medium and distributed, or may be downloaded to the imaging apparatus 100 through a network. It should be noted that a part or all of functions of the image processor 110 may be realized by hardware such as an IC (Integrated Circuit), or may be realized as a combination of software and hardware.

In this case, in the present embodiment, the filter 10 provided in the opening portion of the imaging apparatus 100 includes the first to fourth filter regions 11 to 14 as described above.

The image sensor 30 photo-electrically converts the light transmitted through the filter 10 and the lens 20, and sends an electric signal to the image processor 110. The lens 20 may be provided between the filter 10 and the image sensor 30 or the filter 10 may be provided between the lens 20 and the image sensor 30. When there are a plurality of lenses 20, the filter 10 may be provided between the two lenses. The filter 10 may be provided on the surface of the lens 20.

The image sensor 30 includes first to third sensor 31 to 33. The first sensor 31 is a sensor R for detecting the light in the first wavelength region, the second sensor 32 is a sensor G for detecting the light in the second wavelength region, the third sensor 33 is a sensor B for detecting the light in the third wavelength region.

The first sensor 31 generates an image R based on the detected light of the red wavelength region.

The second sensor 32 generates an image G based on the detected light of the green wavelength region.

The third sensor 33 generates an image B based on the detected light of the blue wavelength region.

In this case, since the second sensor 32 detects the light of the green wavelength region that passed through all of the first to fourth filter regions 11 to 14 as described above, the image G becomes brighter and less noisy image than the other images (the image R and the image B). It can be said that the image G is an image less affected by the provision of the filter 10. Therefore, the image G generated by the second sensor 32 is an image that is close to an ideal image obtained without the filter 10 (hereinafter referred to as a reference image). On the other hand, since the image R generated by the first sensor 31 and the image B generated by the third sensor 33 are images generated from the lights transmitted through the two filter regions of the first to fourth filter regions 11 to 14, the image R generated by the first sensor 31 and the image B generated by the third sensor 33 are different from the reference image, the image G, or the like. The details of the image R and the image B will be described later.

As described above, the image R, the image G, and the image B generated by the first to third sensors 31 to 33 are output to the image processor 110.

As shown in FIG. 4, the image processor 110 includes an input module 111, a distance calculation module 112, and an image generation module 113.

The input module 111 inputs the image R, the image G, and the image B generated by the first to third sensors 31 to 33.

The distance calculation module 112 calculates the distance (hereinafter referred to as an object distance) from the imaging apparatus 100 to the object based on the image R, the image G, and the image B input by the input module 111. In this case, the distance calculation module 112 calculates the object distance for each pixel of the captured image. The calculation processing of the object distance by the distance calculation module 112 will be described later.

Based on the image R, the image G, and the image B input by the input module 111 and (distance information indicating) the object distance calculated for each pixel by the distance calculation module 112, the image generation module 113 generates an image (hereinafter referred to as a display image) to be displayed on the display 80.

In FIG. 4, the imaging apparatus 100 has been described as including the image processor 110, but for example, the image processor 110 may be provided in an image processing apparatus or the like separate from the imaging apparatus 100.

Figure 5:
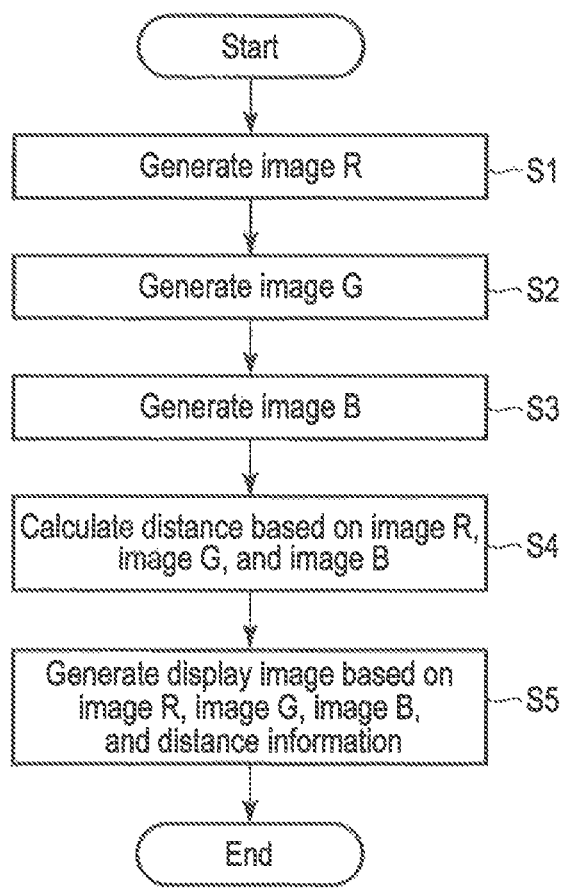
FIG. 5 is a flowchart showing an example of a processing procedure of the imaging apparatus.

Subsequently, the processing procedure of the imaging apparatus 100 according to the present embodiment will be described with reference to the flowchart of FIG. 5.

First, when the imaging of the object by the imaging apparatus 100 is started, the light transmitted through the filter 10 and the lens 20 provided in the imaging apparatus 100 reaches the image sensor 30.

In this case, the first sensor 31 (sensor R) included in the image sensor 30 detects (receives) the light of the red wavelength region from the light transmitted through the first filter region 11 and the fourth filter region 14 and generates an image R (step S1).

The image R generated in this step S1 is different from the reference image and the like as described above.

In this case, the image R generated by the first sensor 31 will be conceptually explained with reference to FIG. 6.

As described above, the filter 10 provided in the opening portion of the imaging apparatus 100 includes the first to fourth filter regions 11 to 14 having different transmittance characteristics, but in the following description, of the first to fourth filter regions 11 to 14, the region including the first filter region 11 and the fourth filter region 14 transmitting the light of the red wavelength region (i.e., the region on the left half of the filter 10 as seen from the object side captured by imaging apparatus 100) will be referred to as a filter R region 201 for the sake of convenience. The right column and the middle column of FIG. 6 show the blur shapes of the images formed on the image sensor 30. The left column of FIG. 6 shows the combination of the lens 20 and the filter 10 and the image sensor 30 when the imaging apparatus 100 is seen from the upper direction (i.e., the positive direction of the Y axis).

In the following description, the distance from the position at which the imaging apparatus 100 is in focus (hereinafter referred to as a focus position) to the object will be referred to as a distance d. The distance d is a positive value when the position of the object is farther than the focus position with respect to the focus position serving as a reference (0), and the distance d is a negative value when the position of the object is closer (nearer) than the focus position.

First, suppose a case where the position of object is farther than the focus position, i.e., the distance d>0. In this case, the object is out of focus, and therefore, blurring occurs in the image R. This also applies to the image G.

As described above, the image R is an image generated based on the light transmitted through the filter R region (the region on the left half of the filter 10) 201. Therefore, as shown in the upper part of FIG. 6, for example, the blur shape of the image R (hereinafter simply referred to as a blur shape) 201a when the distance d>0 holds is a shape deviating to the right side as compared with a blur shape 202a of the image G. More specifically, the blur shape 202a of the image G has a point symmetrical shape according to the shape of the filter 10 (opening portion), and a blur shape 201a of the image R has a non-point symmetrical shape (shape deviating to the right side) according to the shape of the filter R region 201.

The blur shape described in the present embodiment is assumed to be the shape of a blur occurring in a predetermined range including a specific pixel. This also applies to the following description.

A function representing the shape of a blur such as the blur shapes 201a and 202a is referred to as a blur function (PSF: Point Spread Function).

Subsequently, it is assumed that the position of object matches the focus position, i.e., the distance d=0. As shown in the middle part of FIG. 6, blurring does not occur in the image R in this case. When distance d=0 holds, no blur occurs in image G either.

Furthermore, it is assumed that the position of the object is closer than the focus position, i.e., the distance d<0. In this case, the object is out of focus, and therefore, blurring occurs in the image R.

As described above, the image R is an image generated based on the light transmitted through the filter R region 201. The blur shape 201b of image R when the distance d<0 holds is, for example, a shape deviating to the left side as compared with the blur shape 202b of the image G as shown in the lower side of FIG. 6.

More specifically, like the blur shape 201a described above, the blur shape 201b has a non-point symmetrical shape according to the shape of the filter R region 201, and has a shape in which the blur shape 201a inverted around a straight line parallel to the Y axis direction.

On the other hand, the blur shape 202b of the image G in this case has a point symmetrical shape similar to the blur shape 202a of the image G described above.

Back to FIG. 5 again, the second sensor 32 (sensor G) included in the image sensor 30 detects (receives) the light of the green wavelength region from the lights transmitted through the first to fourth filter regions 11 to 14 and generates an image G (step S2).

Since the light of the green wavelength region transmits all the filter regions as described above, the image G is an image close to the reference image.

Subsequently, the third sensor 33 (sensor B) included in the image sensor 30 detects (receives) the light of the blue wavelength region from the light transmitted through the second filter region 12 and the fourth filter region 14 and generates an image B (step S3).

The image B generated in this step S3 is different from the reference image and the like as described above.

Figure 7:
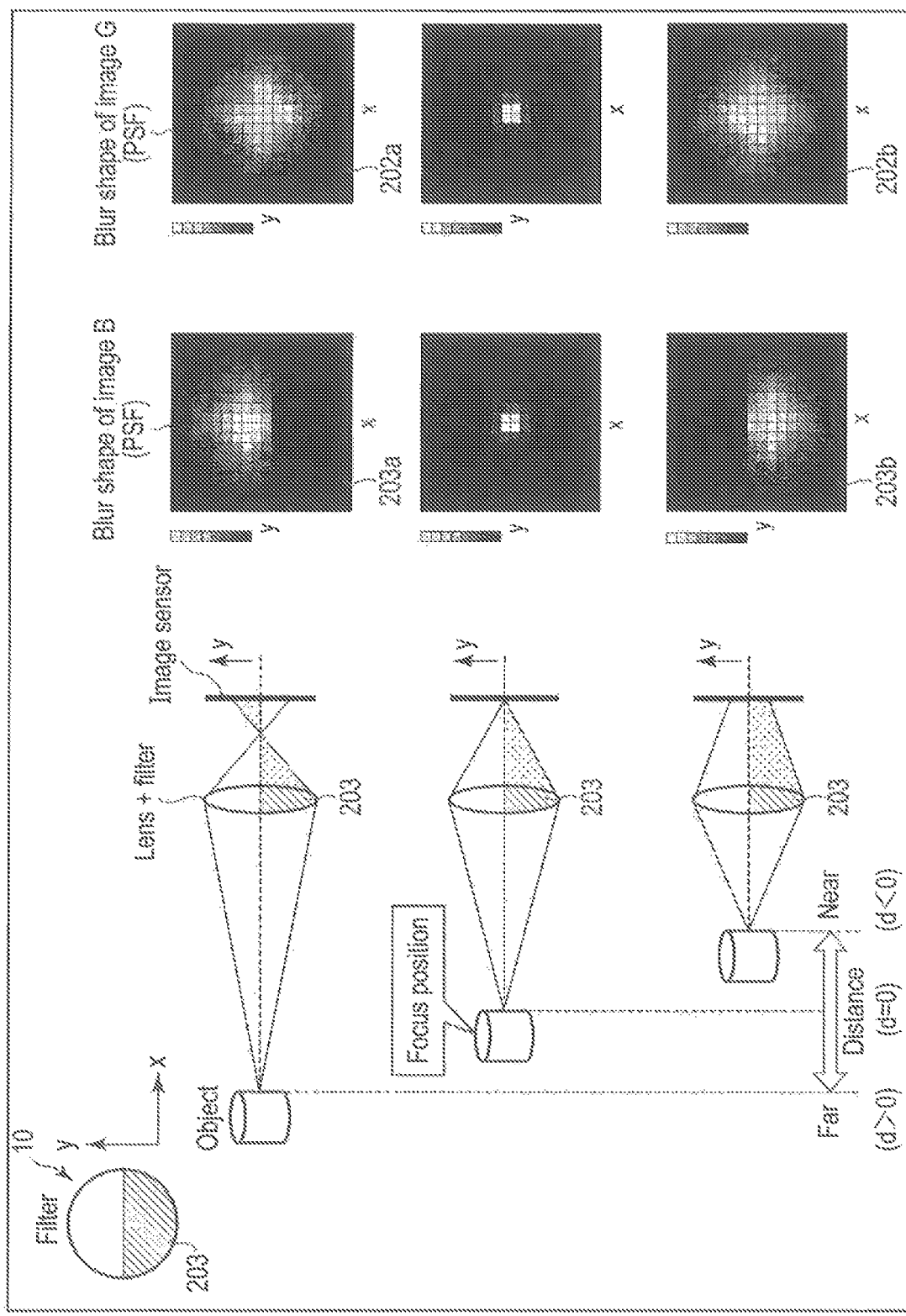
FIG. 7 is a diagram for conceptually explaining an image B generated by the third sensor.

In this case, the image B generated by the third sensor 33 will be conceptually explained with reference to FIG. 7. The blur shape of the image G shown in FIG. 7 is as described in FIG. 6, so a detailed description thereof is omitted.

As described above, the filter 10 provided in the opening portion of the imaging apparatus 100 includes the first to fourth filter regions 11 to 14 with different transmittance characteristics, but in the following explanation, of the first to fourth filter regions 11 to 14, a region including the second filter region 12 and the fourth filter region 14 which transmits the light of the blue wavelength region (i.e., a region in the lower half of the filter 10 when seen from the object side captured by imaging apparatus 100) will be referred to as a filter B region 203 for the sake of convenience. The right column and the middle column of FIG. 7 show the blur shape of the image formed on the image sensor 30. The left column of FIG. 7 shows the combination of the lens 20 and the filter 10 and the image sensor 30 when the imaging apparatus 100 is seen from the right direction (i.e., the positive direction of the X axis).

First, it is assumed that the position of the object is farther than the focus position, i.e., the distance d>0. In this case, the object is out of focus, and therefore, blurring occurs in the image B. This also applies to the image G.

As described above, the image B is an image generated based on the light transmitted through the filter B region (the lower half region of the filter 10) 203. Therefore, for example, the blur shape 203a of the image B in the case of distance d>0 holds has a shape deviating to the upper side as compared with the blur shape 202a of the image G as shown in the upper part of FIG. 7. More specifically, the blur shape 203a of the image B is a non-point symmetrical symmetric shape (a shape deviating to the upper side) according to the shape of the filter B region 203.

Subsequently, it is assumed that the position of object matches the focus position, i.e., the distance d=0. As shown in the middle part of FIG. 7, blurring does not occur in the image B in this case.

Further, it is assumed that the position of object is closer than the focus position, i.e., the distance d<0. In this case, the object is out of focus, and therefore, blurring occurs in the image B.

As described above, the image B is an image generated based on the light transmitted through the filter B region 203. For example, the blur shape 203b of the image B in the case of the distance d<0 holds is a shape deviating to the upper side as compared with the blur shape 202b of the image G as shown in the lower part of FIG. 7.

More specifically, like the blur shape 203a described above, the blur shape 203b has a non-point symmetrical shape according to the shape of the filter B region 203, and has a shape in which the blur shape 203a inverted around a straight line parallel to the X axis direction.

As described above, in the image R and the image B, blur shape changes according to distance d. More specifically, if the distance d>0 holds, the blur shape of the image R changes to a semicircular shape (non-point symmetrical shape) in which the left side of the blur shape of the image G is missing. If the distance d<0 holds, the blur shape of the image R changes to a semicircular shape in which the right side of the blur shape of the image G is missing. If the distance d>0 holds, the blur shape of the image B changes to a semicircular shape (non-point symmetrical shape) in which the lower side of the blur shape of the image G is missing. If the distance d<0 holds, the blur shape of the image B changes to a semicircular shape (non-point symmetrical shape) in which the upper side of the blur shape of the image G is missing.

Figure 8:
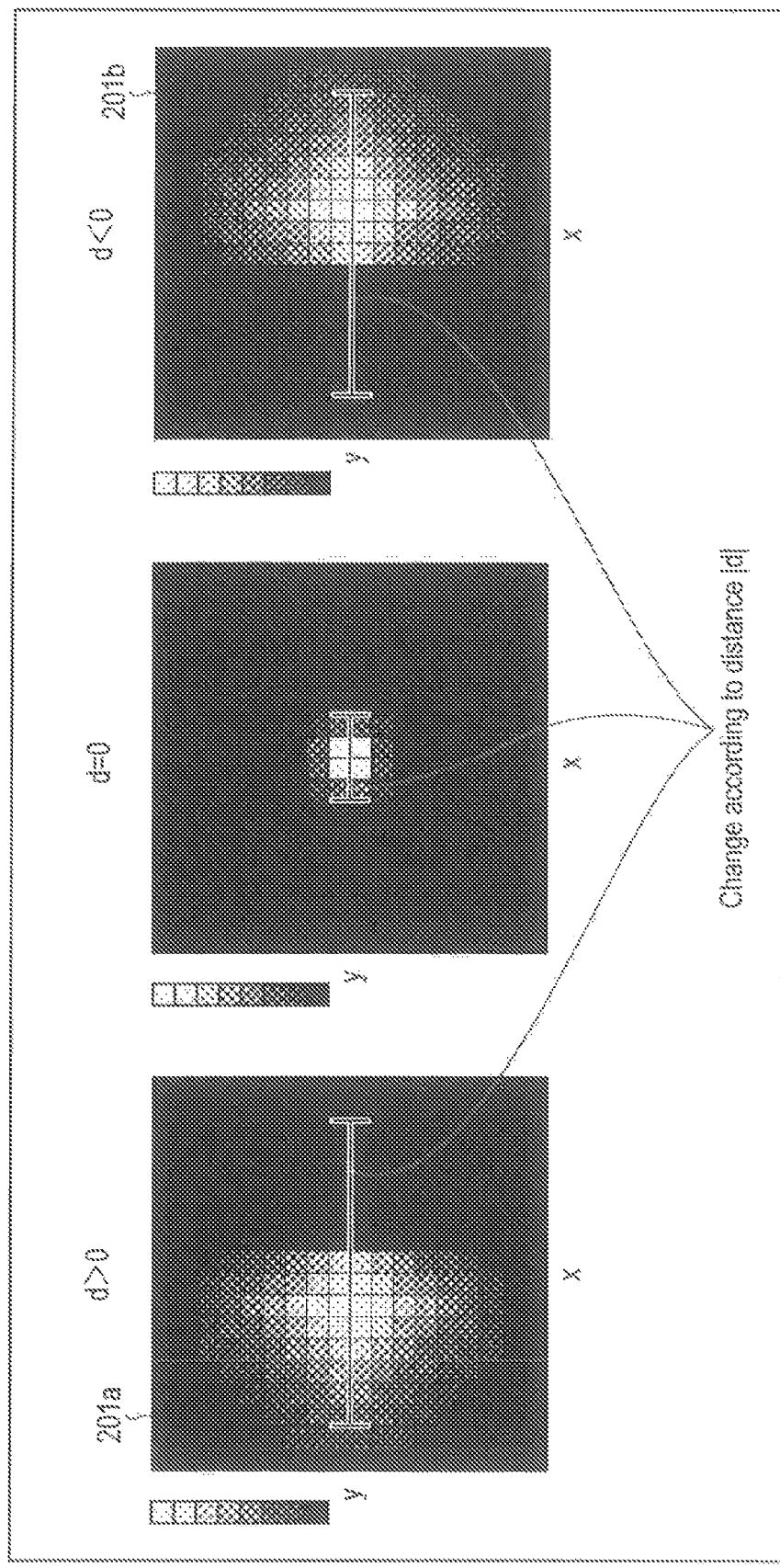
FIG. 8 is a view showing a change in the size of the blur shape of image R.
Figure 9:
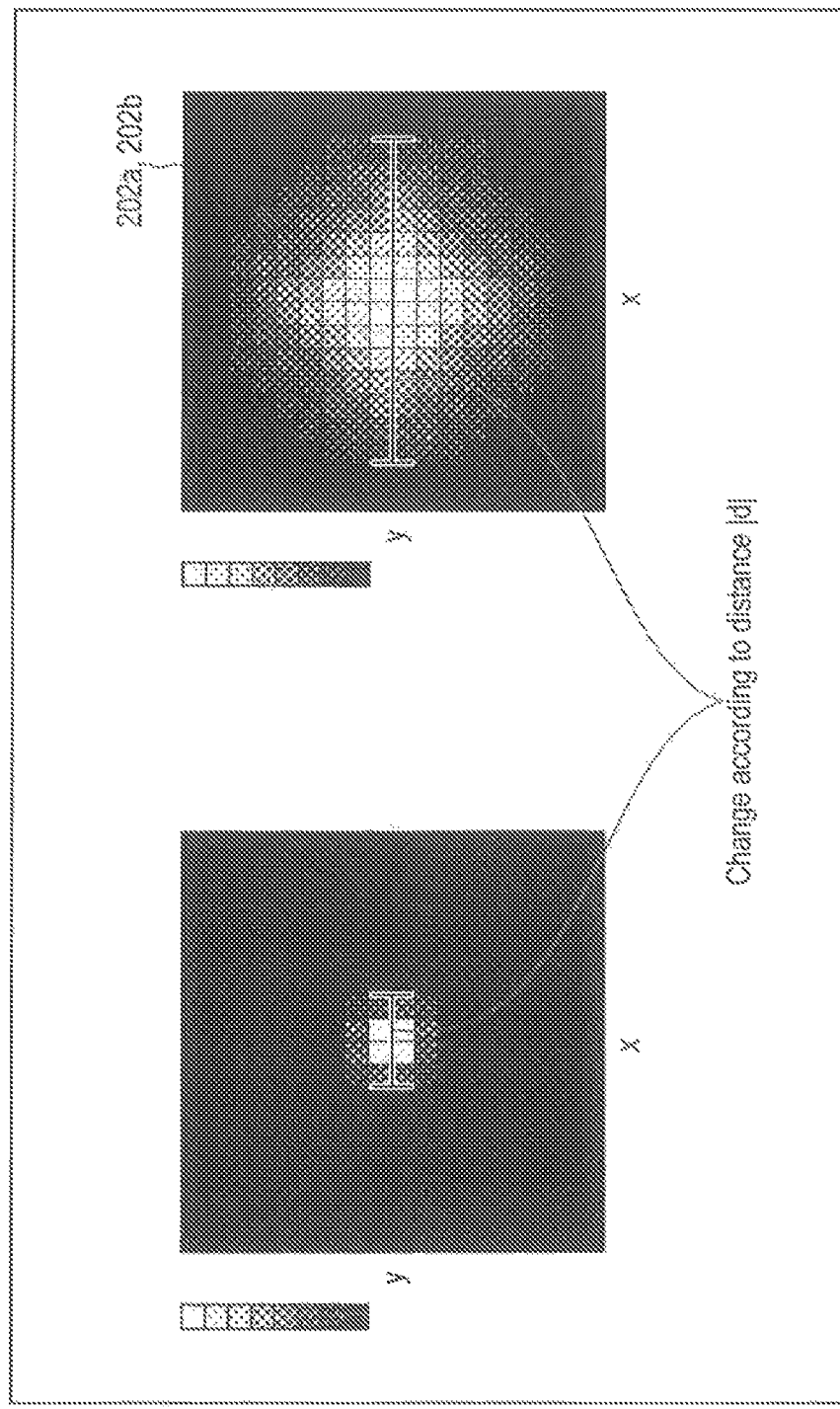
FIG. 9 is a view showing a change in the size of the blur shape of image G.
Figure 10:
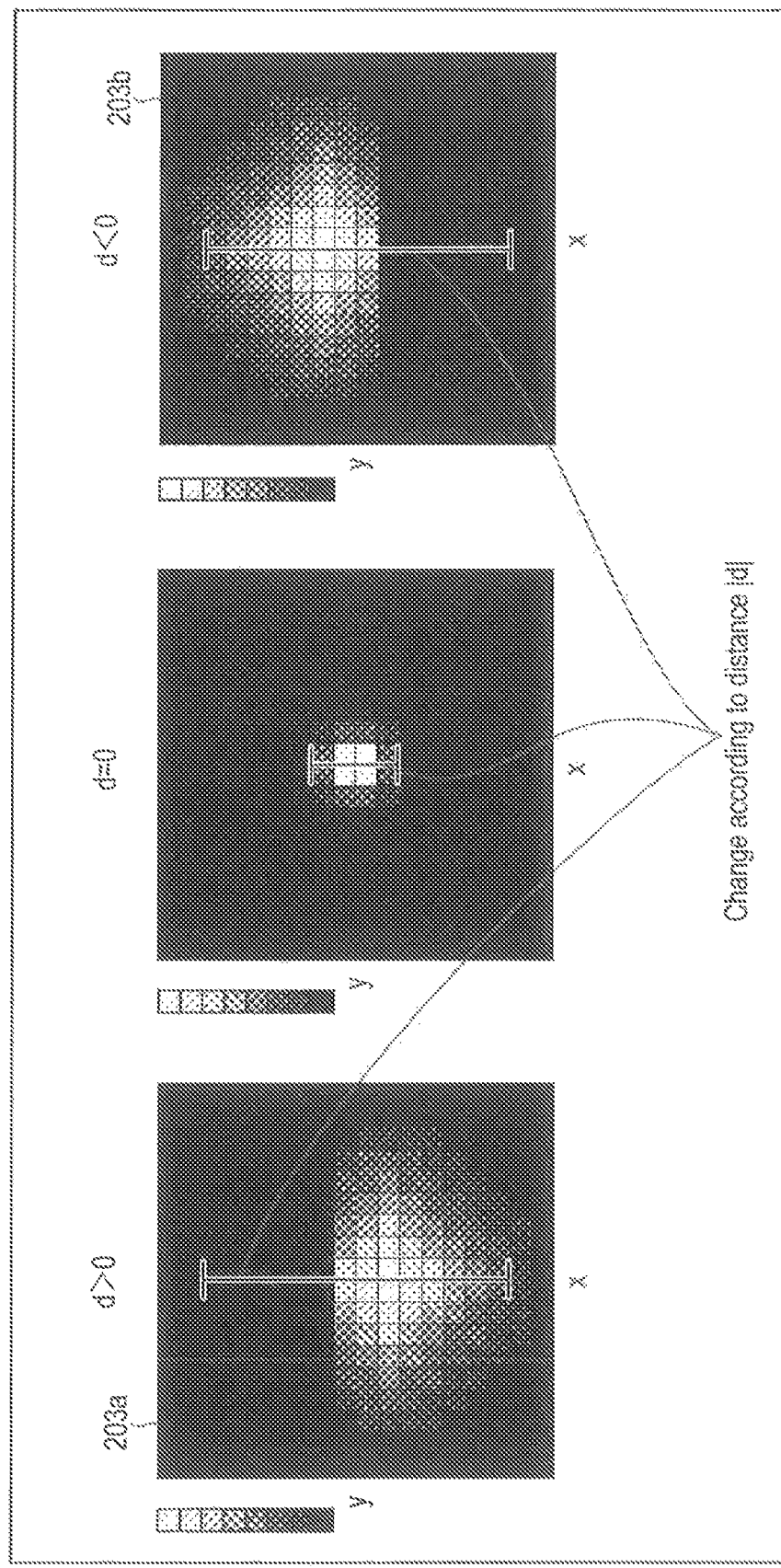
FIG. 10 is a view showing a change in the size of the blur shape of image B.

Although not shown in FIGS. 6 and 7, the size (width) of the blur shape in the image R, the image G, and the image B depends on distance |d|. FIG. 8 shows that the size of the blur shape of the image R varies according to distance |d|. FIG. 9 shows that the size of the blur shape of the image G varies according to distance |d|. FIG. 10 shows that the size of blur shape of the image B varies according to distance |d|. More specifically, the size of the blur shape becomes larger (wider) as the distance |d| increases.

In the present embodiment, the object distance is calculated using the characteristics of the captured image (the image R, the image G, and the image B) generated based on the light transmitted through the filter 10 as described above.

Back to FIG. 5 again, the image R generated in step S1, the image G generated in step S2, and the image B generated in the step S3 explained above are input by the input module 111 included in the image processor 110.

The distance calculation module 112 calculates an object distance based on the image R, the image G, and the image B input by the input module 111 (step S4). In step S4, for example, the object distance is calculated for each pixel constituting the captured image by comparing the blur shapes of the image R and the image B with the blur shape of the image G which change according to the distance d from the focus position to the object with respect to the image G close to the reference image serving as a reference.

Hereinafter, the calculation processing (i.e., processing in step S4) by the distance calculation module 112 will be described. In this case, an image G that is close to the reference image will be referred to as a reference image. Each of the image R and the image B in which the blur shape is changed as compared with the reference image will be referred to as a target image.

In step S4, the distance calculation module 112 corrects the blur shape of the target image by applying a correction filter (correction kernel) that adds a blur corresponding to any given distance, and compares the blur shape of the corrected target image and the blur shape of the reference image to compute the object distance. The correction filter includes a blur function that adds blur to the blur shape by applying it to the blur shape of the target image. The correction filter is prepared in advance for each different distance d.

Hereinafter, a case where the correction filter is is applied to the blur shape of the image R will be described with reference to FIG. 11. In this case, the blur shape 201a of the image R in a case where distance d>0 holds will be explained as shown in FIG. 11.

Figure 11:
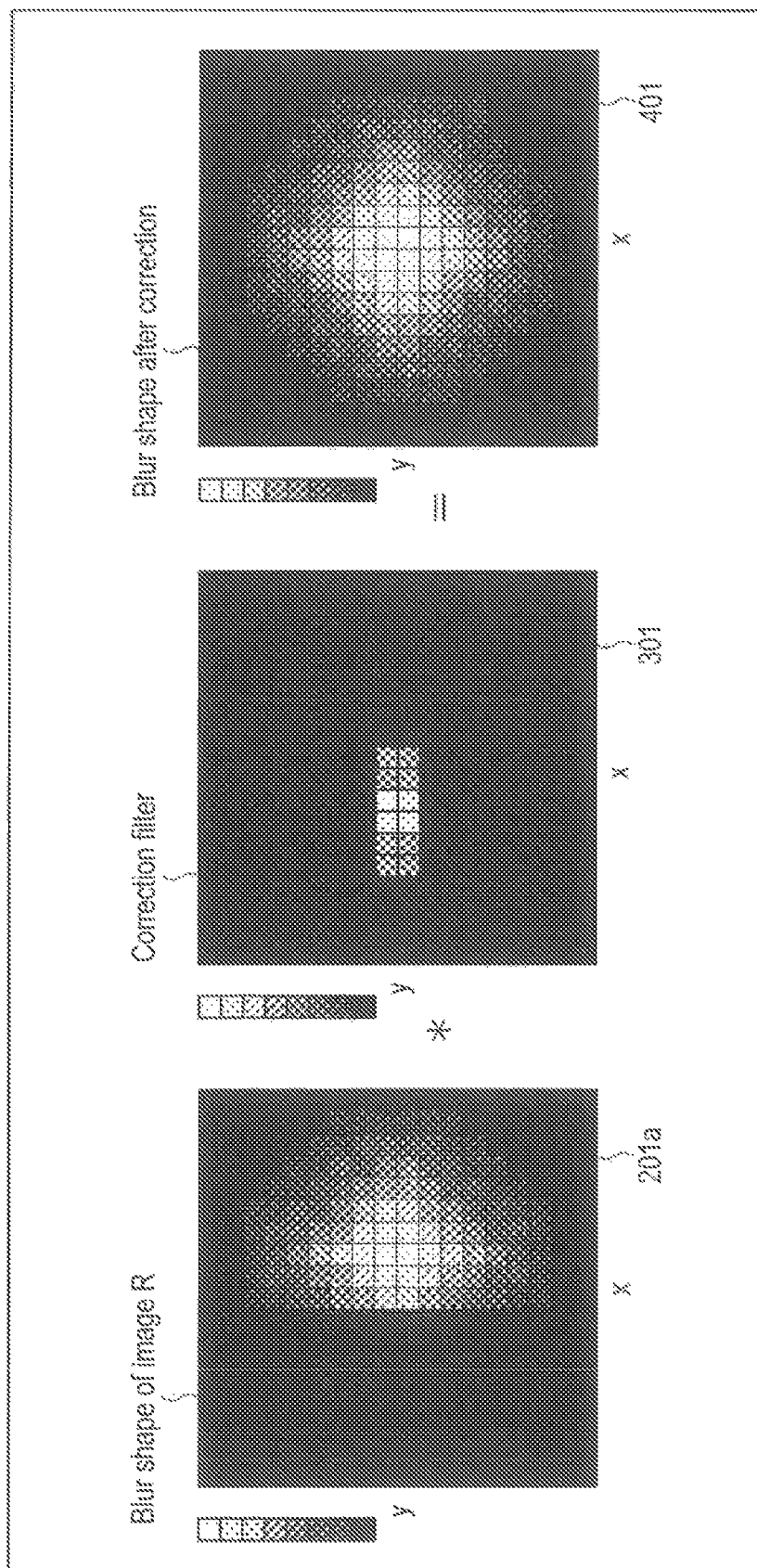
FIG. 11 is a view for explaining a case where a correction filter is applied to the blur shape of image R.

The correction filter 301 as shown in FIG. 11 corresponds to a blur function in which a blur is distributed on a straight line (around a straight line) which passes through the center point of a line (line 10a shown in FIG. 2) that divides the filter R region 201 (the first filter region 11 and the fourth filter region 14) and the other filter region (the second filter region 12 and the third filter region 13) and which is in a negative direction of X axis perpendicular to the line.

When the correction filter 301 explained above is applied to the blur shape 201a of the image R, the blur shape 401 obtained by adding blur to the blur shape 201a of the image R is generated as shown in FIG. 11.

In FIG. 11, only one correction filter has been described. In the present embodiment, as described above, multiple correction filters corresponding to different distances d are prepared. Therefore, the blur shape to which the blur is added to the blur shape 201a (i.e., the blur shape 201a is corrected) is generated for each correction filter (different distance d). As described above, since the width (size) of the blur shape depends on the distance d, the correction filter corresponding to each of the distances d has a different blur size (amount) added by the correction filter.

In this case, the distance calculation module 112 compares blur shapes (hereinafter referred to as post-correction blur shapes) generated for different distances d and a blur shape (hereinafter referred to as reference blur shape) of the reference image (image G) to determine whether or not the post-correction blur shape and the reference blur shape match each other. Therefore, the distance calculation module 112 identifies the distance d corresponding to the correction filter used for the generation of the post-correction blur shape determined to match the reference blur shape which is one of multiple post-correction blur shapes generated for different distances d.

In this case, a plurality of correction filters corresponding to different distances d will be conceptually described with reference to FIGS. 12 to 15.

Figure 12:
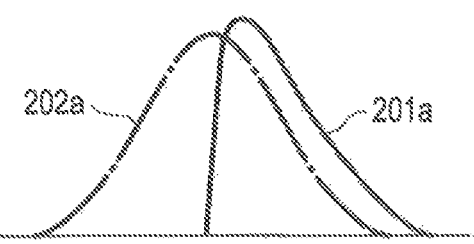
FIG. 12 is a diagram showing an example of a blur function representing a blur shape of the image R and a blur function representing a blur shape of the image G.

FIG. 12 shows a blur function representing the blur shape 201a of the image R and a blur function representing the blur shape 202a of the image G.

Figure 13:
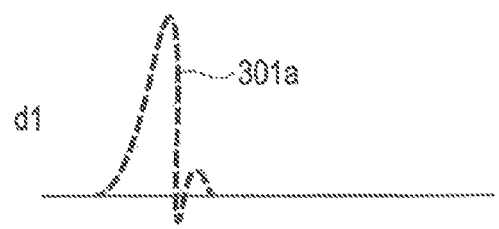
FIG. 13 is a view showing an example of a correction filter corresponding to a distance d1.
Figure 14:
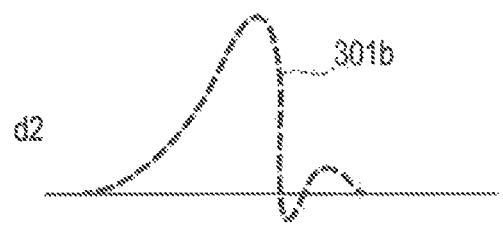
FIG. 14 is a view showing an example of a correction filter corresponding to a distance d2.
Figure 15:
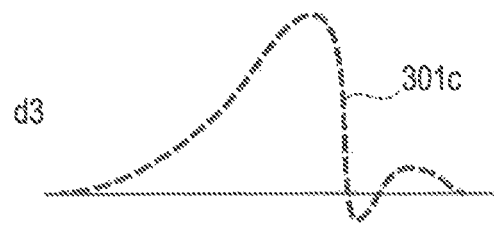
FIG. 15 is a view showing an example of a correction filter corresponding to a distance d3.

In contrast, for example, FIG. 13 represents (blur function representing blur added by) a correction filter 301a corresponding to distance d. For example, FIG. 14 represents (blur function representing blur added by) a correction filter 301b corresponding to distance d2. For example, FIG. 15 represents (blur function representing blur added by) a correction filter 301c corresponding to distance d3. The correction filters 301a to 301c are prepared in advance as correction filters applied to the blur shape 201a of the image R. It is assumed that the distances d1, d2, and d3 satisfy a relationship of d1<d2<d3.

In this case, the blur shape is added to the blur shape 201a by applying (convolving) the correction filters 301a to 301c to (blur function representing) the blur shape 201a of image R shown in FIG. 12. As described above, it is determined whether or not the blur shape (i.e., post-correction blur shape) obtained by adding blur to the blur shape 201a matches the blur shape of the reference image (reference blur shape) 202a.

For example, as shown in FIGS. 12 and 13, even if the blur (shape) corresponding to the correction filter 301a is added to the blur shape 201a of the image R, the post-correction blur shape does not match the reference blur shape 202a.

For example, as shown in FIGS. 12 and 14, when blur corresponding to the correction filter 301b is added to the blur shape 201a of the image R, the post-correction blur shape matches the reference blur shape 202a.

For example, as shown in FIGS. 12 and 15, even if blur corresponding to the correction filter 301c is added to the blur shape 201a of the image R, the post-correction blur shape does not match the reference blur shape 202a.

Accordingly, the distance calculation module 112 can identify the distance d2 corresponding to the correction filter 301b.

In the present embodiment, not only when the post-correction blur shape completely matches the reference blur shape but also, for example, when the degree of match between the post-correction blur shape and the reference blur shape is equal to or more than a predetermined value (threshold), the distance d corresponding to the correction filter used for generation of the post-correction blur shape may be identified. For example, the degree of match can be calculated by calculating the correlation between the post-correction blur shape and the reference blur shape using similarity evaluation method and the like. More specifically, the distance d can be identified by finding the post-correction blur shape that has the highest correlation with the reference blur shape.

The similarity evaluation methods that can be used include sum of squared difference (SSD), sum of absolute difference (SAD), normalized cross-correlation (NCC), zero-mean normalized cross-correlation (ZNCC), Color Alignment Measure, and the like.

By executing the processing as described above, the distance d can be identified using the image R and the image G, and the object distance can be calculated based on the distance d and the focal distance (focus position) and the like of the imaging apparatus 100.

In this case, the blur shape 201a of the image R when distance d>0 holds has been mainly explained, but for example, this explanation is also applicable to the blur shape 201b of the image R when distance d<0 holds. More specifically, in the case of the blur shape 201b, a post-correction blur shape may be generated by applying a correction filter in which blur is distributed in a direction opposite to the correction filter 301 (positive direction of the X axis). The processing subsequent to the generation of the post-correction blur shape is the same as those that is performed when the distance d>0 holds.

Subsequently, the case where the correction filter is applied to the blur shape of the image B will be described with reference to FIG. 16. In this case, as shown in FIG. 16, the blur shape 203a of the image B when the distance d>0 holds will be explained.

Figure 16:
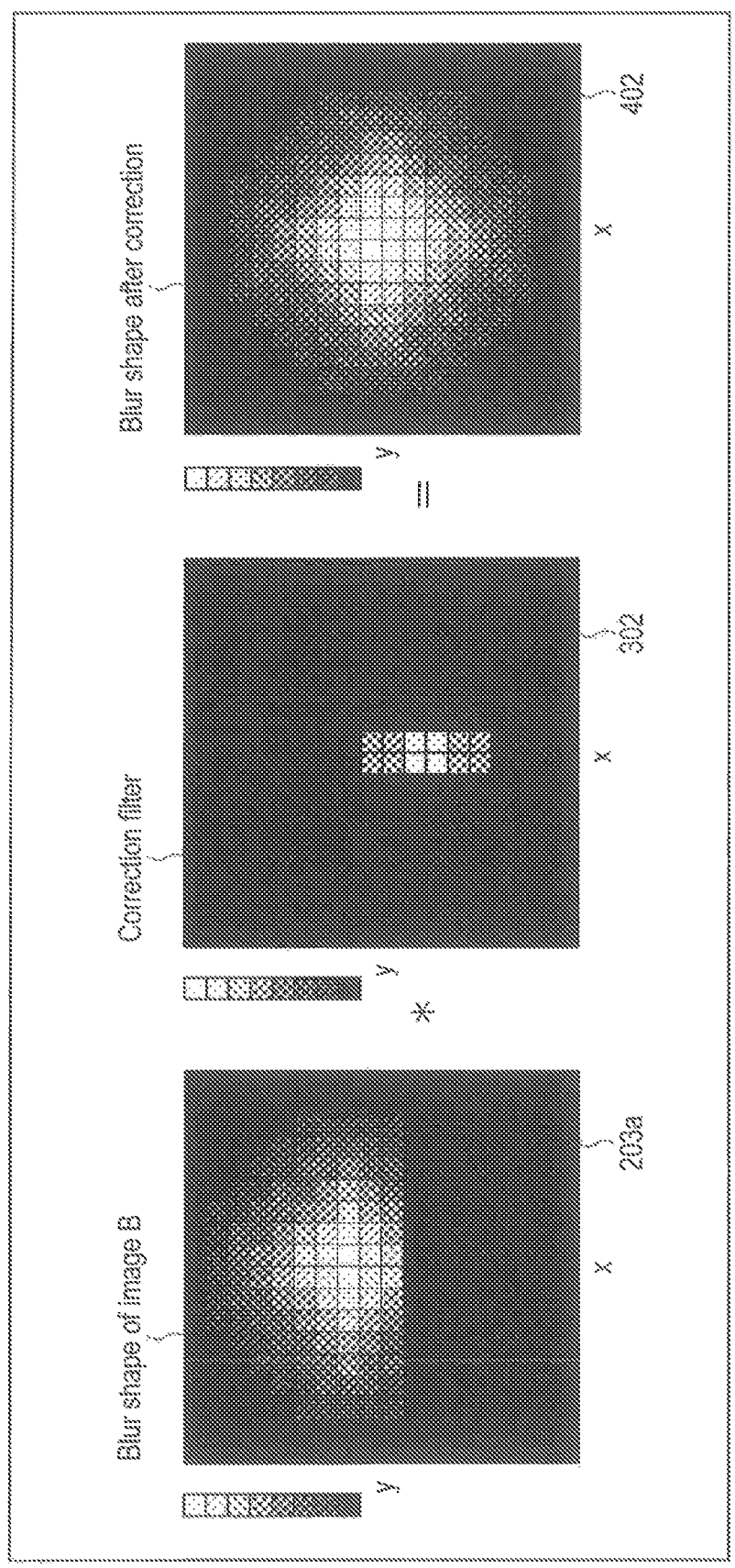
FIG. 16 is a diagram for explaining a case where the correction filter is applied to the blur shape of the image B.

The correction filter 302 as shown in FIG. 16 corresponds to a blur function in which a blur is distributed on a straight line (around a straight line) which passes through the center point of a line (line 10b shown in FIG. 25 that divides the filter B region 203 (the second filter region 12 and the fourth filter region 14) and the other filter region (the first filter region 11 and the third filter region 13) and which is in a negative direction of Y axis perpendicular to the line.

When the correction filter 302 explained above is applied to the blur shape 203a of the image B, the blur shape 402 (correction image) obtained by adding blur to the blur shape 203a of the image B is generated as shown in FIG. 16.

In FIG. 16, only one correction filter has been described. In the present embodiment, as described above, multiple correction filters corresponding to different distances d are prepared. Therefore, the blur shape to which the blur is added to the blur shape 203a (i.e., the blur shape 203a is corrected) is generated for each correction filter (different distance d).

In this case, the distance calculation module 112 compares blur shapes (post-correction blur shapes) generated for different distances d and the reference blur shape to determine whether or not the post-correction blur shape and the reference blur shape match each other. Therefore, the distance calculation module 112 identifies the distance d corresponding to the correction filter used for the generation of the post-correction blur shape determined to match the reference blur shape which is one of multiple post-correction blur shapes generated for different distances d.

The plurality of correction filters corresponding to different distances d prepared in advance for the image B are as described in the above-mentioned FIGS. 12 to 15 and the like so a detailed description thereof will be omitted.

By executing the processing as described above, the distance d can be identified using the image B and the image G, and the object distance can be calculated based on the distance d and the focal distance (focus position) and the like of the imaging apparatus 100.

In this case, the blur shape 203a of the image B when distance d>0 holds has been mainly explained, but for example, this explanation is also applicable to the blur shape 203b of the image B when distance d<0 holds. More specifically, in the case of the blur shape 203b, a post-correction blur shape may be generated by applying a correction filter in which blur is distributed in a direction opposite to the correction filter 302 (positive direction of the Y axis). The processing subsequent to the generation of the post-correction blur shape is the same as those that is performed when the distance d>0 holds.

The object distance can be calculated using one of the image R and the image B, and the image G. For example, one of step S1 and step S3 of FIG. 5 may be omitted, and the distance may be calculated from two kinds of images in S4. In the case of calculating the distance using three kinds of images, for example, both of the distance d identified using the image R and the image G and the distance d identified using the image B and the image G may be taken into consideration, so that as object distance can be calculated more accurately. In this case, for example, the object distance may be calculated on the basis of one of the distance d identified using the image R and the image G and the distance d identified using the image B and the image G, whichever is identified with a higher degree of match (correlation) calculated. Alternatively, for example, the object distance may be calculated on the basis of an average value and the like of the distance d identified using the image R and the image G and the distance d identified using the image B and the image G.

For each of the image R and the image B, a curvature of the degree of match between the reference blur shape and the post-correction blur shape corresponding to each of the different distances d can be calculated. This curvature of the degree of match corresponds to the reliability of the distance d identified using the image R or the image B. Therefore, the object distance may be calculated on the basis of one of the distance d identified using the image R and the image G and the distance d identified using the image B and the image G, whichever has a higher degree of reliability based on the above curvature of the degree of match.

In this case, the above-mentioned blur shape is a shape of blur in a predetermined range including a particular pixel. Therefore, in the present embodiment, by executing the processing described above for each pixel constituting the captured image, the distance information indicating the object distance can be obtained for each pixel.

Back to FIG. 5 again, the image generation module 113 generates a display image based on the image R, the image G, and the image B input by the input module 111 and the distance information indicating the object distance calculated for each pixel in step S4 (step S5). The display image contains an image (hereinafter referred to as a distance image) obtained by adding the depth of space (more specifically, distance information) to the captured image. In the distance image (distance map), for example, when the distance to the object contained in the distance image is close to imaging apparatus 100, (a pixel corresponding to) the object is displayed in red, and when the distance to the object is farther from the imaging apparatus 100, (a pixel corresponding to) the corresponding object is displayed in blue. According to such a distance image, the distance from the imaging apparatus 100 to the object can be found intuitively. For example, the distance image may be an image or the like in which the distance information is added only to the edge portion detected according to the luminance difference in the captured image.

In the present, embodiment, a color image (RGB image) is generated on the basis of the image R, the image G, and the image B. Therefore, a color image may be generated as the display image. In this case, the blur shapes of the image R and the image B may be corrected according to the object distance calculated in step S4 so that a color image is generated. Image processing (for example, processing for removing blur and the like) may be executed on the generated color image as described above on the basis of the object distance, so that an all-in-focus image (an image focused at all distances), a refocus image (an image focused at a designated distance) or the like may be generated.

For example, the display image generated by the image generation module 113 as described above is output to the display 80 and displayed on the display 80. It is also possible to generate the distance image, the color image, the all-in-focus image, and the refocus image explained above, so that the image designated by the user may be displayed on the display 80 as a display image. Although the display image has been described as being output to the display 80 in this case, the display image may be output to various apparatuses outside of the imaging apparatus 100.

In the present embodiment, it is possible to output various kinds of information (images) using distance information.

More specifically, for example, a list (table) representing the correspondence relationship between the position (range) in the color image and the distance from the imaging apparatus 100 may be output, or an image may be output so as to display only (a pixel corresponding to) the object within a predetermined distance (range). The maximum value, the minimum value, the median (center value), and the average value of the distance from the imaging apparatus 100 in the captured image may be output, or the result obtained by dividing the region of the color image according to the distance may be output. A result of extracting only objects existing at any given distance may be output. Furthermore, a result of recognition processing of objects in the captured images using distance information, and a result of action recognition processing for a person or an animal in the captured image may be output. In the case where the imaging apparatus 100 includes a focusing mechanism, the distance information may be output to the focusing mechanism so that the distance information is used for improving the focusing speed. As described above, distance information indicating the calculated object distance in the present embodiment may be used for various processing.

For example, the above-mentioned color image and distance image may not be output separately, but may be output by connecting the distance image (data) after the color image (data). For example, it is also possible to connect and output distance image after image data in YUV (luminance signal, color difference signal [Cb], color difference signal [Cr]) format. Furthermore, the above list may be output after the color image.

When the distance image is output, the distance corresponding to the designated position on the distance image may be displayed as a pop-up. The distance information may be displayed as a pop-up on the color image.

In the present embodiment, although the object distance is calculated for each pixel, the distance does not have to be calculated for all pixels in the image. For example, an object serving as a target for detecting the distance may be specified beforehand. For example, the identification of the object can be performed by image recognition or designation through input of a user who uses the imaging apparatus 100.

Furthermore, even if the object distance is calculated for all the pixels, it is not necessary to place all of the object distance (distance information indicating the object distance) in the output data. For example, the distance information may not be placed on a region which is determined not to be important through image recognition and the like.

As described above, in the present embodiment, the filter 10 that transmits incident light to capture an image of an object includes the first filter region 11 that transmits the light of the red wavelength region (first wavelength region) and that does not transmit (that shields) the light of the blue wavelength region (second wavelength region), the second filter region 12 that does not transmit the light of the red wavelength region and that transmits the light of the blue wavelength region, the third filter region 13 that does not transmit the light of the red wavelength region and that does not transmit the light of the blue wavelength region, and the fourth filter region 14 that transmits the light of the red wavelength region and that transmits the light of the blue wavelength region.

When the filter 10 described above is used, the blur shape of the image R (first image) generated by (the first sensor 31 included in) the image sensor 30 on the basis of the light of the red wavelength region having transmitted through the first filter region 11 and the fourth filter region 14 is different from the blur shape of the blur shape of the image B (second image) generated by (the third sensor 33 included in) the image sensor 30 on the basis of the light of the blue wavelength region having transmitted through the second filter region 12 and the fourth filter region 14, and the blur shape of the image R and the blur shape of the image B have non-point symmetrical shapes.

In the present embodiment, since the object distance from the captured image (image R, image B, and image G) generated on the basis of the incident light that has passed through the filters 10 can be calculated, the distance information can be obtained with high precision in a compact and low cost manner.

By the way, in the present embodiment, as described above, the object distance can be calculated by convolving the correction filter and adding blur to the blur shape of the image R generated on the basis of the light of the red wavelength region having passed through the filter R region 201 (the first filter region 11 and the fourth filter region 14). Likewise, in the present embodiment, the object distance can be calculated by convolving the correction filter and adding blur to the blur shape of the image B generated on the basis of the light of the blue wavelength region having passed through the filter B region 203 (the second filter region 12 and the fourth filter region 14). Hereinafter, the direction in which blur is added to the blur shape of the image R will be referred to as the convolution direction of image R, and the direction in which blur is added to the blur shape of the image B will be referred to as the convolution direction of image B.

In the present embodiment, for example, as shown in FIG. 2, the first filter region 11 is arranged adjacent to the upper side of the fourth filter region 14. The second filter region 12 is arranged adjacent to the right side of the fourth filter region 14. With such a configuration, the convolution direction of the image R in the present embodiment is leftward or rightward, and the convolution direction of the image B is upward or downward.

In this case, for example, of the filter regions 11 to 14 arranged at the position as shown in FIG. 2, a filter is assumed in which the first filter region 11 and the fourth filter region 14 are configured to be the filter R region and the second filter region 12 and the third filter region 13 are configured to be the filter B region. For example, such filter is realized by setting the left half of the filter concerned as a "yellow filter" and setting the right half of the filter as a "cyan filter". Hereinafter, this filter is referred to as a left and right two-split type filters.

Even when the left and right two-split type filter is provided in the opening portion, it is possible to calculate the object distance in the same way as the imaging apparatus 100 according to the present embodiment, but in this case, the convolution directions of the image R and the image B are both in the horizontal direction (horizontal direction). More specifically, when the convolution direction of image R is leftward, the convolution direction of image B is rightward. When the convolution direction of image R is rightward, the convolution direction of image B is leftward.

By the way, if there is an edge in the horizontal direction in the captured image, the object distance cannot be calculated even if the correction filter is convoluted in the direction along the edge (horizontal direction) at the edge part in the image R and the image B. More specifically, even if a plurality of correction filters corresponding to different distances d are convoluted, the convolution results (i.e., post-correction blur shape) of edges in a direction perpendicular to the line dividing the filter R region and the filter B region are the same and the distance d cannot be identified, so the object distance cannot be calculated as a result.

Therefore, when using the above left and right two-split type filter, the convolution direction of the image R and the convolution direction of the image B are both in the horizontal direction, and therefore, the object distance cannot be calculated (detected) for the edge portion in the horizontal direction no matter whether the image R is used or the image B is used.

In contrast, in the present embodiment, the first to fourth filter regions 11 to 14 are arranged so that the convolution direction of the image R and the convolution direction of the image B intersect with each other (i.e., are orthogonal to each other). For this reason, it is possible to identify the distance d by using the image B whose convolution direction is in the vertical direction (vertical direction) (i.e., the image B and the image G are compared) in the case of edges in the horizontal direction, and it is possible to identify the distance d by using the image R whose convolution direction is in the horizontal direction (i.e., the image R and the image G are compared) in the case of edges in the vertical direction.

More specifically, in the present embodiment, the first to fourth filter regions 11 to 14 are arranged so that a line dividing the filter R region and the other line dividing the filter B region and the other region cross each other, and the convolution directions of the image R and the image B are not in the same direction, so that the object distance can be calculated regardless of the edge direction.

The arrangement of the first to fourth filter regions 11 to 14 shown in FIG. 2 (more specifically, the configuration of the filter 10) is an example, and as described above, the filter 10 may be arranged so that the first to fourth filter regions 11 to 14 are arranged so that convolution directions of the image R and the image B are not in the same direction. For example, the arrangement of the first filter region 11 and the second filter region 12 may be interchanged or the arrangement of the third filter region 13 and the fourth filter region 14 may be exchanged.

Figure 17:
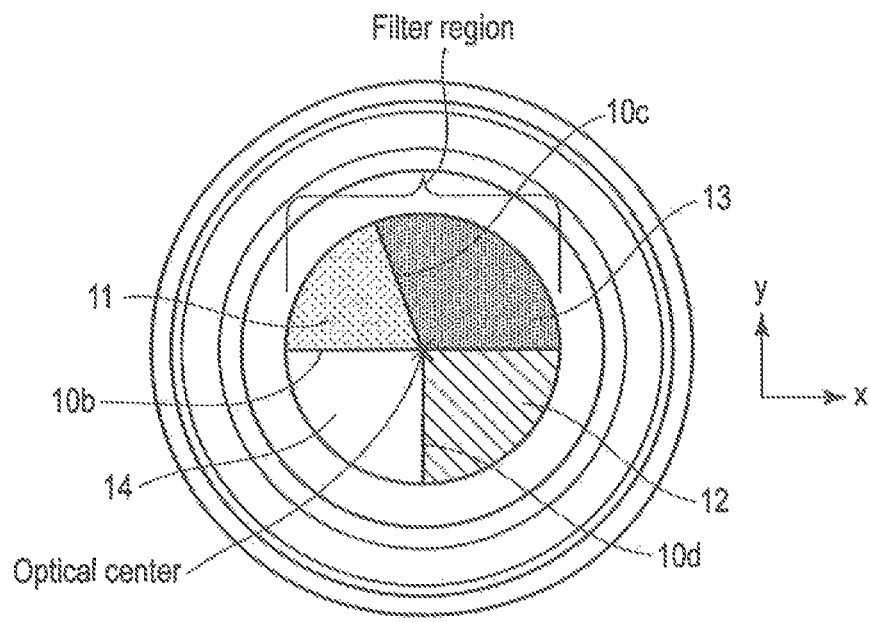
FIG. 17 is a diagram showing another arrangement example of the first to fourth filter regions.

The filter 10 may be divided into the first to fourth filter regions 11 to 14 by at least two or more lines intersecting each other, and for example, as shown in FIG. 17, the filter 10 (region) may be divided into the first to fourth filter regions 11 to 14 by three lines (straight lines) 10b, 10c, and 10d that intersect at the center of filter 10.

Figure 18:
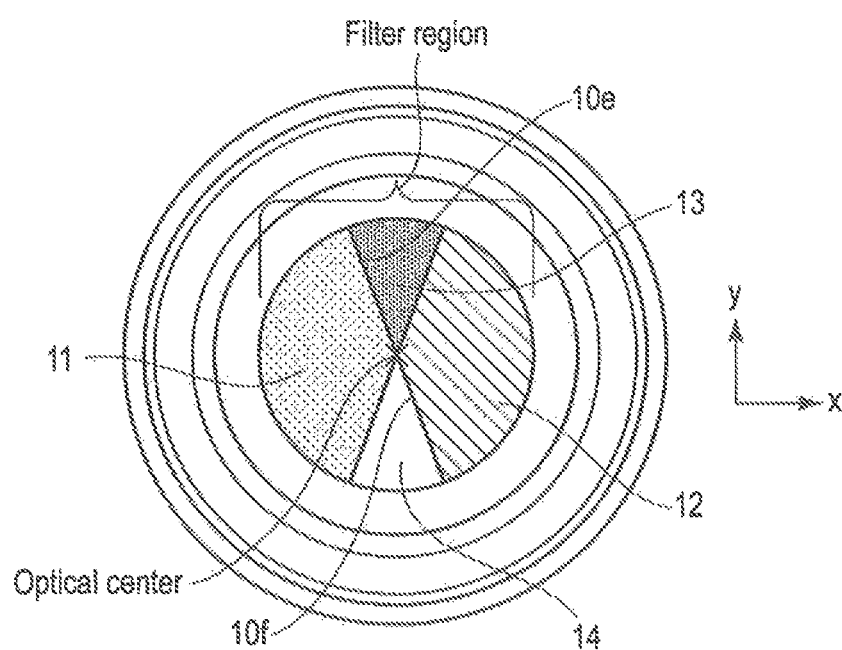
FIG. 18 is a diagram showing still another arrangement, example of the first to fourth filter regions.
Figure 19:
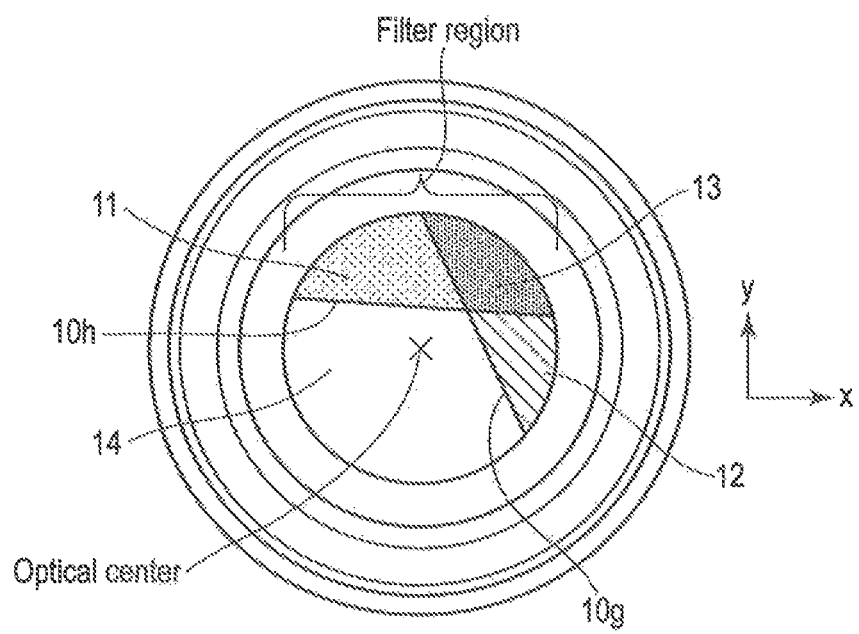
FIG. 19 is a diagram showing still another arrangement example of the first to fourth filter regions.

Furthermore, in the present embodiment, the first to fourth filter regions 11 to 14 were described as having a fan shape of the same size as shown in FIG. 2, but for example, all of the first to fourth filter regions 11 to 14 may not have the same shape so that the filter 10 is divided by the two lines 10e and 10f shown in FIG. 18. For example, two or more lines dividing the filter 10 into the first to fourth filter regions 11 to 14, such as the lines 10g and 10h shown in FIG. 19, do not have to intersect at the center of filter 10. Although not shown, the line dividing the filter 10 into the first to fourth filter regions 11 to 14 may be a curved line instead of a straight line.

In the present embodiment, the filter 10 is divided into four filter regions, but there may be five or more filter regions as long as the filter R region and the filter B region are arranged so that the convolution directions of the image R and the image B are different, and all of the filter regions included in the filter 10 are configured to transmit light of the green wavelength region. When it is possible to generate the reference image corresponding to the image G, at least one filter region included in the filter 10 may be configured not to transmit the light of the green wavelength region.

In this case, in the present embodiment, the color of the light in the wavelength region that transmits all of first to fourth filter regions 11 to 14 included in filter 10 (hereinafter referred to as common color), is green, but this is because an image sensor 30 having more sensors (second sensors 32) which receive the green wavelength region than sensors (first sensors 31) which receive the red wavelength region and sensors (third sensors 33) which receive the blue wavelength region is often employed. In the case of such an image sensor 30, the amount of light received by the image sensor 30 can be increased by setting the common color to green.

The common color is not limited to green. For example, it is possible to use a filter 10 having red as a common color in a case where the first filter region 11 is configured to be a "yellow filter", the second filter region 12 is configured to be a "magenta (M: Magenta) filter", the third filter region 13 is configured to be a "red (R: Red) filter", and the fourth filter region 14 is configured to be a "transparent filter". The "magenta filter" is a filter that transmits light of the red wavelength region and light of the blue wavelength region (does not transmit the light of the green wavelength region). In this case, the object distance can be calculated by comparing the post-correction blur shape of the image G with the blur shape of the image R (reference blur shape) or by comparing the post-correction blur shape of the image B with the blur shape of the image R.

Likewise, for example, it is possible to use a filter 10 having blue as a common color in a case where the first filter region 11 is configured to be a "magenta filter", the second filter region 12 is configured to be a "cyan filter", the third filter region 13 is configured to be a "blue (B: Blue) filter", and the fourth filter region 14 is configured to be a "transparent filter". In this case, the object distance can be calculated by comparing the post-correction blur shape of the image R with the blur shape of the image B (reference blur shape) or By comparing the post-correction blur shape of the image G with the blur shape of the image B.

In the present embodiment, for the sake of convenience of explanation, the filter 10 has a circular shape, but the filter 10 may have a shape corresponding to the shape of the opening portion of the imaging apparatus 100. More specifically, the outer periphery of the filter 10 may be formed as a diaphragm blade shape of the imaging apparatus 100, and for example, the filter 10 may have a polygonal (for example, hexagonal, octagonal, and the like) shape.

As described above, although the present embodiment can be realized with the filter 10 including the first to fourth filter regions 11 to 14 of various shapes or arrangements, but for example, the shapes of the first to fourth filter regions 11 to 14 may be determined based on constraints of hardware on the imaging apparatus 100 or the like. More specifically, a line memory is used when convolving (i.e., adding blur to the blur shape) the correction filter with the blur shape of the image R or the image B, but for example, the necessary capacity of the line memory differs depending on the convolution direction of the image R or the image B. Therefore, the shapes of the first to fourth filter regions 11 to 14 (i.e., the convolution directions of the image R or the image B) may be set according to the capacity of the line memory. More specifically, the shapes of the first to fourth filter regions 11 to 14 may be determined so that convolution is possible with the line memory.

As described above, for example, if the convolution direction of image R, which is one of the image R and the image B, is a direction along the edge, it is not possible to calculate the object distance using this image R. In this case, although it is possible to calculate the object distance using image B, it is preferable to calculate the object distance using both the image R and the image B in order to improve the accuracy. Therefore, for example, in the case where the direction of the edge in the captured image can be expected based on the object and the like captured by the imaging apparatus 100, the shapes of the first to fourth filter regions 11 to 14 may be determined such that the convolution directions of the image R and the image B are different from the direction of the edge.

When the convolution directions of the image R or the image B are the horizontal direction, the influence of the discretization error can be reduced and the accuracy can be improved as compared with the case where it is in the other direction. Therefore, the shapes of the first to fourth filter regions 11 to 14 may be determined so that one of the convolution directions of the image R and the image B becomes the horizontal direction.

As shown in FIG. 2 described above, according to the configuration in which the convolution direction of the image R is in the horizontal direction and the convolution direction of the image B is orthogonal to the convolution direction of the image R, it is possible to improve the accuracy and realize high robustness (robustness) for the edge in the captured image.

As described above, by defining (changing) the shape (or arrangement) of the first to fourth filter regions 11 to 14, various convolution directions of the image R and the image B can be realized, but a plurality of correction filters corresponding to different distances d may be prepared in advance according to the convolution direction. More specifically, it is sufficient if a correction filter that adds blur to the convolution directions of the image R and the image B is prepared in advance.

In the present embodiment, the object distance is be calculated by comparing the blur shape of the image G (second blur shape) and the blur shape of the image R or the image B (first blur shape) corrected by the correction filter corresponding to different distances d, and therefore, it is possible to acquire the distance information with high accuracy by using a general-purpose image sensor. For example, the image R and the image B are regarded as two images taken with the stereo camera, and the object distance can be calculated based on the parallax amount between the image R and the image B.

Further, in the present embodiment, an image (for example, a distance image and the like) processed based on distance information showing the calculated object distance can be output. According to such distance image, it is possible to easily find the distance from the imaging apparatus 100 to the object.

The present embodiment is explained as using the image sensor 30 including the RGB sensors for detecting (receiving) red, green, and blue colors, but an image sensor including a sensor that detects another color may be used. Even in this case, the distance information can be obtained in the same way by providing a filter of the present embodiment corresponding to the color detected by the sensor.

In the present embodiment, since it is possible to acquire distance information indicating the object distance, three-dimensional information about the space captured by the imaging apparatus 100 can be obtained. For example, three-dimensional information (output from the imaging apparatus 100) that can be obtained according to the present embodiment is information about the position of the object, the movement of the object, the distance to the object, whether the object falls within or out of a predetermined range, and the like. This three-dimensional information can be used for various processing and the like besides the one described in the present embodiment.

Figure 20:
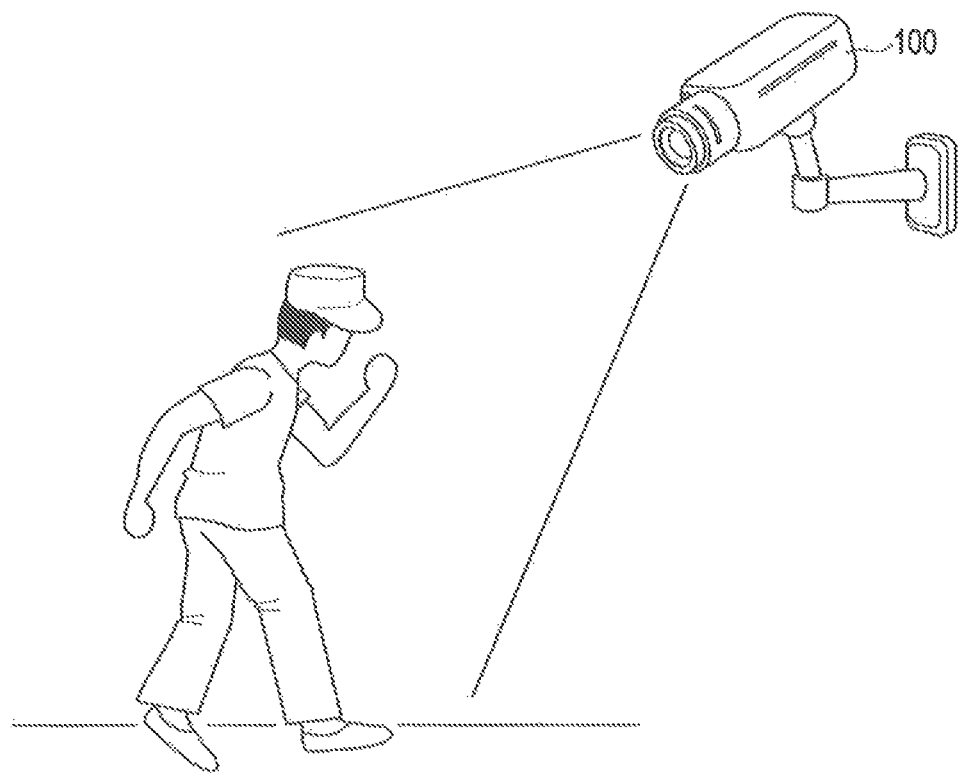
FIG. 20 is a diagram showing an example of an imaging apparatus applied to a monitor system.

More specifically, for example, the imaging apparatus 100 according to the present embodiment can be applied to a monitor system which monitors a predetermined range (such as a person present in the range) as shown in FIG. 20.

Here, FIG. 21 is a block diagram showing an example of the functional configuration of a monitor system 1000 according to the present embodiment. In this case, for example, it is assumed that the monitor system 1000 is a system for finding the flow of people in facilities for each time zone.

As shown in FIG. 21, the monitor system 1000 has an imaging apparatus 100, a controller 1001, and a user interface module 1002. The imaging apparatus 100 and the controller 1001 may be connected via a wired network or wirelessly.

The controller 1001 causes the imaging apparatus 100 to continuously perform imaging and displays the image of the object captured by the imaging apparatus 100 via the user interface module 1002. For example, the user interface module 1002 executes display processing for a display apparatus and the like and input processing from a keyboard or a pointing device. The display apparatus and the pointing device may be an integrated device such as, for example, a touch screen display.

For example, the controller 1001 analyzes a flow of a person such as in which direction a person is walking and where what part of an aisle the person is walking, based on the three-dimensional information about the person sequentially output from the imaging apparatus 100, and records the analysis result in a storage apparatus such as, for example, an HDD (Hard Disk Drive). This analysis is not necessarily performed in real time and may be executed as batch processing using three-dimensional information about the object stored in the storage apparatus.

Figure 22:
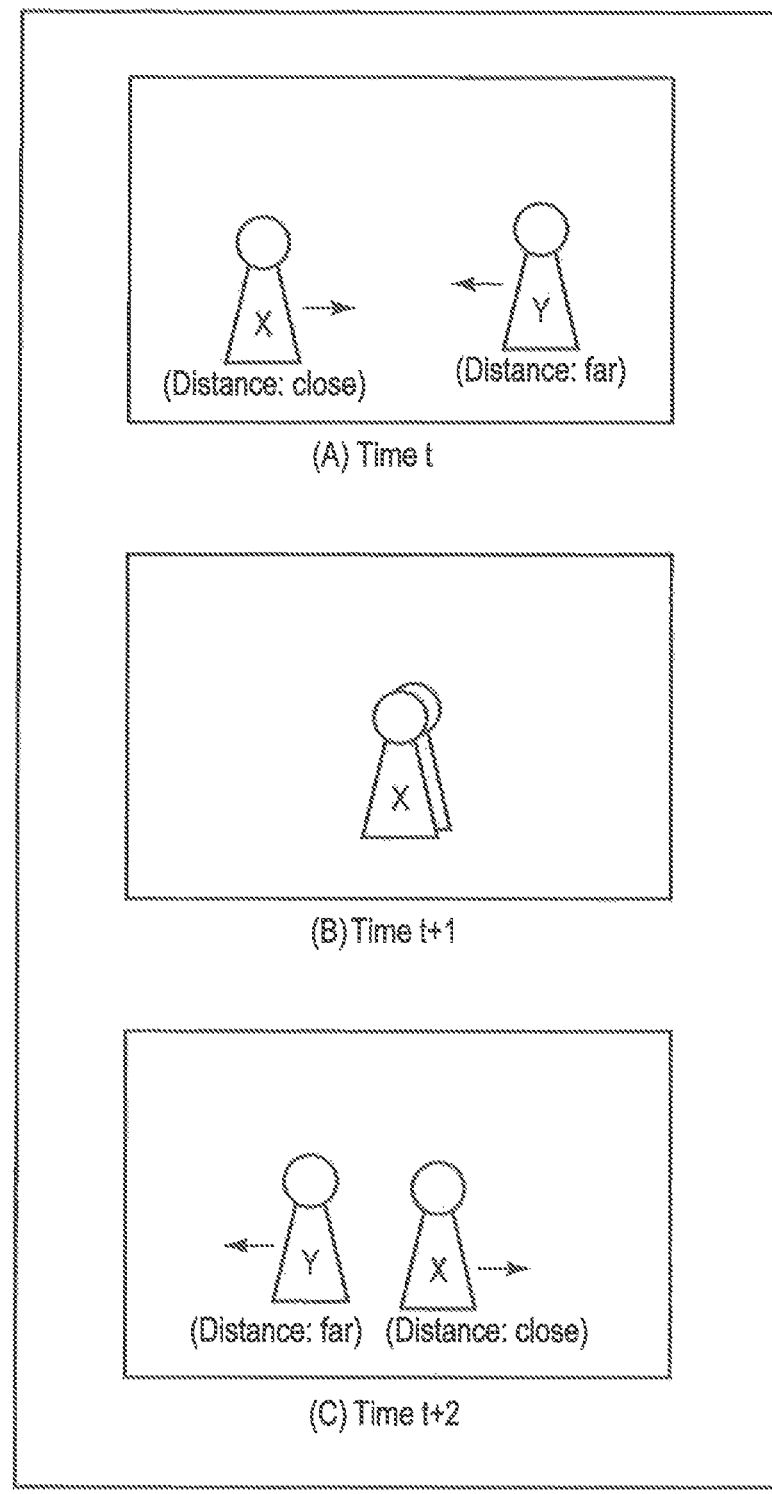
FIG. 22 is a diagram for explaining an application example of three-dimensional information in object tracking.

Subsequently, an example of utilization of three-dimensional information (distance information) in the tracking of the object captured by the imaging apparatus 100 will be described with reference to FIG. 22.

In this case, it is assumed that a person X moves from the left to the right as seen from the imaging apparatus 100, and a person Y is going to move from the right to the left on the contrary (A). When the short person X is located closer to the viewer than the tall person Y as seen from the imaging apparatus 100 and the persons X and Y overlap with each other, the sizes of the person images on the images are substantially the same as each other.

When the persons X and Y move as described above, person images on the image (object image) overlaps each other (B) at a certain point, and then separates from each other to the left and right hand sides (C). In such a case, for example, if the person images are followed only with image recognition without using the distance, there is a possibility that the persons X and Y are falsely tracked as if each of the persons X and Y makes a U-turn when the tracking target is mistaken when the person images cross each other.

In contrast, by using three-dimensional information (distance), it is possible to prevent a situation in which the tracking target is misinterpreted when the person images cross each other.

For example, the monitor system 1000 may be used for outputting an alarm when an object is doing an action other than a predetermined action (for example, entering a no-entry area). Whether an object is doing an action other than a predetermined action can be determined on the basis of the position of the object, the movement of the object, the distance to the object, whether the object falls within or out of a predetermined range, and the like.

For example, the imaging apparatus 100 according to the present embodiment may be used for an automatic control system that controls the movement of various mobile objects.

In this case, FIG. 23 is a block diagram showing an example of a functional configuration of an automatic control system 1100 according to the present embodiment. In this case, for example, as shown in FIG. 24, it is assumed that the mobile object whose operation is controlled by the automatic control system 1100 is an automobile.

As shown in FIG. 23, the automatic control system 1100 includes an imaging apparatus 100, a controller 1101, and a driving mechanism 1102. For example, as shown in FIG. 24, the imaging apparatus 100 is installed in the automobile (mobile) so as to capture an image of the object in the direction of the automobile's traveling direction. In the form of installation for capturing images of objects in the direction of progress of an automobile, the imaging apparatus 100 can be installed to capture images in the front which is a so-called front camera, or the imaging apparatus 100 can be installed to capture images in the back which is a so-called rear camera. It should be understood that both of them can be installed. The imaging apparatus 100 may also be installed as a function as a so-called drive recorder. More specifically, the imaging apparatus 100 may be a video recording apparatus.

The controller 1101 controls the driving mechanism 1102 for operating (moving) automobile based on three-dimensional information output from the imaging apparatus 100. In this case, for example, when approaching a predetermined distance to an object in the direction of travel, it is possible to stop, decelerate, accelerate the moving automobile, or move an automobile at a stop. Alternatively, the controller 1101 may control the driving mechanism 1102 to stop, decelerate, accelerate, and move an automobile when the object is separated by a predetermined distance or more. Alternatively, the controller 1101 may switch the operation mode of the automobile from the normal driving mode to the collision avoidance mode when approaching a predetermined distance to the object, or may switch the operation mode from the collision avoidance mode to the normal driving mode when the automobile is away from the object by a predetermined distance or more. For example, the predetermined distance which serves as a reference of the control by the controller 1101 is a threshold value that can be set by the user.

According to the automatic control system 1100, for example, during automobile traveling, an automobile can operate automatically so that automobile follows the preceding vehicle based on the three-dimensional information (distance information) of the preceding vehicle, or can automatically control the brakes so as not to collide with the preceding vehicle. The three-dimensional information about objects existing behind an automobile is used so that, when an obstacle and the like exists at a position closer than a predetermined distance behind an automobile when the automobile backs up, the brakes can be applied in an automatic manner, or the automobile can be prohibited from backing up. It is also possible to perform control so that the distance between the automobile and the preceding vehicle becomes constant based on the three-dimensional information (distance information) about the preceding vehicle. Therefore, it is possible to easily realize platooning cruising and the like with a plurality of automobiles whose operation (movement) is controlled by the automatic control system.

The above mobile object is not limited to a vehicle including an automobile, and the above mobile object may be a flying object such as drones or airplanes and may be ships as long as it has a driving mechanism for movement, and the above mobile object may be various kinds of robots such as an industrial robot, an AGV (Automatic Guided Vehicle), a cleaning robot, and a communication robot.

FIG. 25 is a block diagram showing an example of a functional configuration of an automatic control system 1200 for controlling the operation of a robot according to the present embodiment. In this case, it is assumed that the robot is an industrial robot installed in a production line and the like which can produce multiple kinds of products, for example.

As shown in FIG. 25, the automatic control system 1200 includes an imaging apparatus 100, a controller 1201, a driving mechanism 1202, and a rotation mechanism 1203.

The controller 1201 controls the driving mechanism 1202 based on the three-dimensional information about the object which is the target object of the work output from an imaging apparatus 100. For example, the driving mechanism 1202 drives a robot arm for attaching a member to a target object and for stacking a target object and conveying the target object to a predetermined place. For example, the imaging apparatus 100 is mounted on a robot arm (such as a palm or a wrist) via a rotation mechanism 1203.

In such an automatic control system, for example, the robot can be controlled to grip a predetermined object and the like by using the three-dimensional information about an object existing around the robot output from the imaging apparatus 100 mounted on the robot arm.

As described above, for example, in a case where the convolution direction of the image R matches the direction along the edge in the captured image, the object distance cannot be calculated using this image R. In this case, it is also possible to cause the imaging apparatus 100 to rotate by controlling the rotation mechanism 1203 with the controller 1201 so that the convolution direction of the image R is not the same as the direction along the edge in the captured image. Although the image R has been explained here, the same applies to the case where the convolution direction of image B matches the direction along the edge in the captured image. According to such configuration, since the object distance can be calculated using both the image R and the image B, calculation precision of the object distance can be improved.

The automatic control system 1200 described above may be used for controlling the operation of the AGV or the cleaning robot. In this case, it is possible to move the AGV or the cleaning robot in a track that avoids an obstacle by using three-dimensional information about an object existing in front of the AGV or the cleaning robot.

Further, the automatic control system 1200 described above may be used to control the operation of a communication robot communicating with a person. In this case, communication with the person can be started when the person approaches within the predetermined range of the communication robot by using three-dimensional information about a person existing in front of the communication robot.

When the mobile object is, for example, a drone, the drone can fly in an orbit that avoids an obstacle by using three-dimensional information about an object existing in front of the drone.

Furthermore, when the mobile object is a drone, the imaging apparatus 100 acquires the image of imaging the inspection target at the time of inspection of cracks or breakage of the electric line from the sky, and the imaging apparatus 100 acquires the three-dimensional information (distance Information) about the inspection target (object). In this case, the drone can fly in parallel with the inspection target by controlling the thrust of the drone so that the distance to the target to be inspected is constant based on the distance to the inspection target. Likewise, for example, it is possible to easily realize platooning flight and the like of the drone by allowing the drones to fly so that the distance to the preceding drones is constant. Furthermore, for example, the drones can be made to fly at a constant (specified) height by allowing the drones to fly so that the distance to the ground (the object existing on the ground) is constant.

As described above, in the present embodiment, control can be executed for at least one of acceleration, deceleration, direction change of various mobile objects or parts thereof, switching between the normal operation mode and automatic operation mode (for example, collision avoidance mode), operation of a safety apparatus such as an air bag, on the basis of three-dimensional information about an object output from imaging apparatus 100. More specifically, when an object exists before a predetermined distance, for example, at least one of deceleration, collision avoidance, direction change in a direction away from the object, and operation of a safe apparatus can be executed. For example, when the object exists behind the predetermined distance, at least one of accelerating and turning in a direction for approaching the object can be executed.

Figure 26:
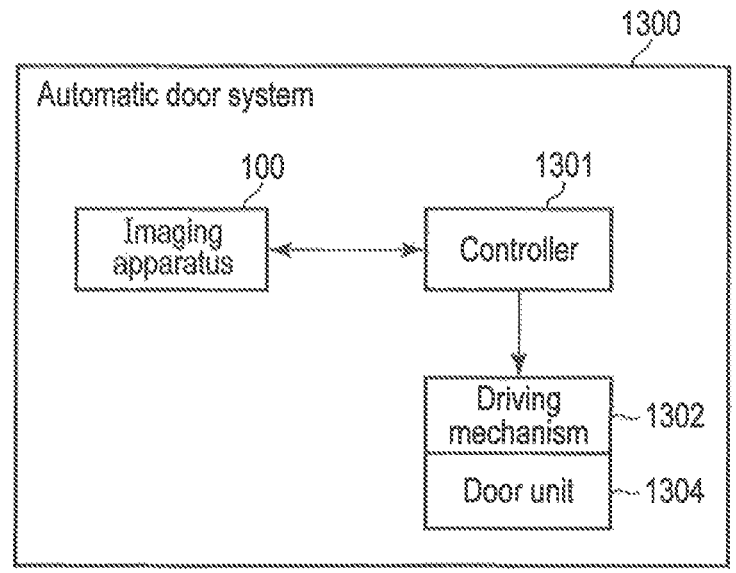
FIG. 26 is a block diagram showing an example of a functional configuration of an automatic control system for controlling the operation of an automatic door.

Further, for example, a mobile object whose operation is controlled by the above-mentioned automatic control system may be a concept including an automatic door. FIG. 26 shows an example of a functional configuration of an automatic control system (hereinafter referred to as "automatic door system") 1300 which controls the operation of the automatic door. As shown in FIG. 26, the automatic door system 1300 includes a controller 1301, a driving mechanism 1302, and a door unit 1303.

In the automatic door system 1300, the imaging apparatus 100 is installed at a position where an image of a person who is about to pass through the automatic door can be captured.

The controller 1301 controls the driving mechanism 1302 to open and close the door unit 1303 based on the three-dimensional information about axis object (person) output from the imaging apparatus 100. More specifically, the controller 1301 controls the driving mechanism 1302 so that the door unit 1303 is in an open state when the object is in front of the predetermined distance. The controller 1301 controls the driving mechanism 1302 so that the door unit 1303 is in a closed state when the object is farther than the predetermined distance. When the door unit 1303 is in the open state and the object is in front of the predetermined distance, the controller 1301 may control the driving mechanism 1302 to keep the door unit 1303 open. When the door unit 1303 is in a closed state, the controller 1301 may control the driving mechanism 1302 to keep the door unit 1303 closed according to the relation between the object and the predetermined distance. The controller 1301 may control the driving mechanism 1302 to open the door unit 1303 when the object moves from a position farther than the predetermined distance to a position closer than the predetermined distance. Further, the controller 1301 may control the driving mechanism 1302 to close the door unit 1303 when the object moves from a position closer than the predetermined distance to a position farther than the predetermined distance.

For example, the driving mechanism 1302 has a motor, and opens and closes the door unit 1303 by transmitting the driving of the motor to the door unit 1303. The driving mechanism 1302 drives the door unit 1303 so that the door unit 1303 is in an opened state or a closed state based on the control by the controller 1301.

Figure 27:
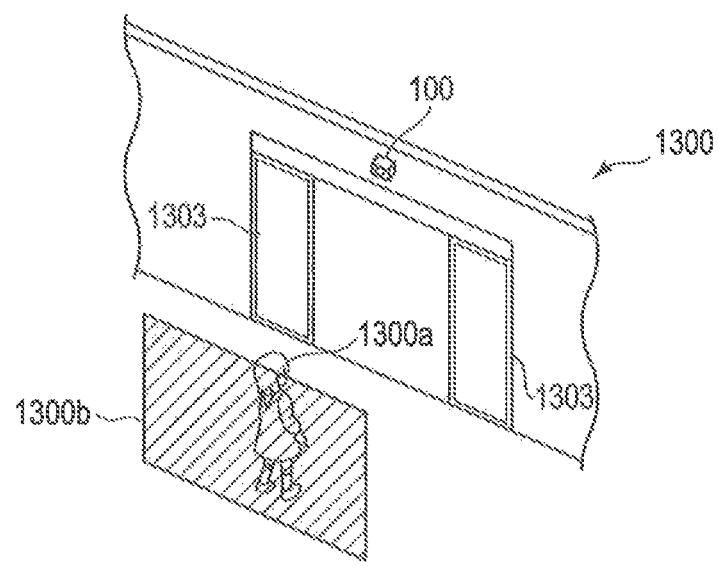
FIG. 27 is a diagram showing an operation example of the automatic door system.
Figure 28:
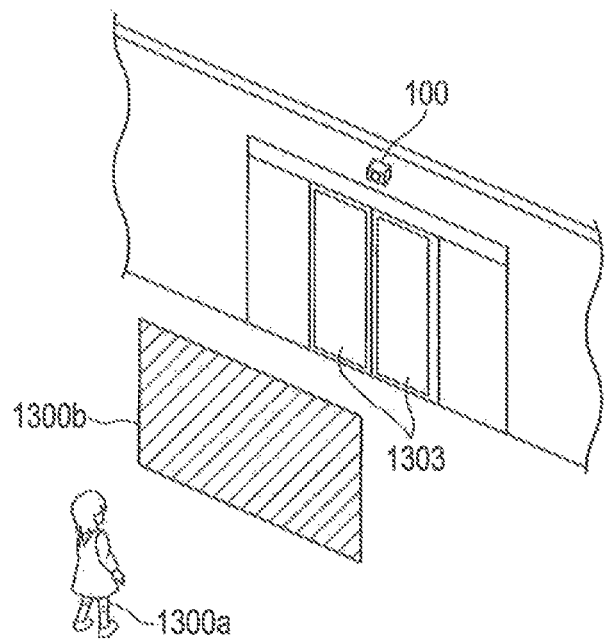
FIG. 28 is a diagram showing an operation example of the automatic door system.

FIGS. 27 and 28 show an operation example of the automatic door system 1300. For example, in the example shown in FIGS. 27 and 28, the imaging apparatus 100 is installed above the door unit 1303, which is a position where a pedestrian (person) or the like moving in front of the door unit 1303 can be photographed. More specifically, the imaging apparatus 100 is installed so that a bird's-eye view image of a passage in the front of the door unit 1303 and the like can be acquired.

In this case, the controller 1301 in the automatic door system 1300 can determine whether or not the pedestrian 1300a, which is an object, is in front of the reference surface 1300b, based on the three-dimensional information output from the imaging apparatus 100. In this case, in an image including a plurality of objects captured by the imaging apparatus 100, only a designated particular object may be adopted as a person (i.e., the pedestrian 1300a) targeted in the automatic door system 1300.

For example, the reference surface 1300b is set to a certain distance from the door unit 1303 in front of the door unit 1303. For example, the reference surface 1300b is a flat surface parallel to the door unit 1303. The reference surface 1300b and the optical axis of the lens 20 of the imaging apparatus 100 may be orthogonal or may not be orthogonal to each other. Although the reference surface is described as being a flat surface, it may be a curved surface.

As shown in FIG. 27, the controller 1301 controls the driving mechanism 1302 to keep the door unit 1303 open if the pedestrian 1300a is in front of the reference surface 1300b. The driving mechanism 1302 drives the door unit 1303 so that the door unit 1303 is in an opened state based on the control by the controller 1301.

As shown in FIG. 28, the controller 1301 controls the driving mechanism 1302 to place the door unit 1303 in a closed state when the pedestrian 1300a is farther than the reference surface 1300b. The driving mechanism 1302 drives the door unit 1303 so that the door unit 1303 is in a closed state based oil the control by the controller 1301.

In this case, the opening and closing of the door unit 1303 is controlled according to whether the pedestrian 1300a is closer or father than the reference surface 1300b. Alternatively, for example, even if the controller 1301 controls the opening and closing of the door unit 1303 in response to the fact that the pedestrian 1300a has moved from a position closer than the reference surface 1300b to a position farther than the reference surface 1300b and the pedestrian 1300a moves from a position closer than the reference surface 1300b to a position farther than the reference surface 1300b. More specifically, when the pedestrian 1300a moves from a position closer than the reference surface 1300b to a position farther than the reference surface 1300b, the door unit 1303 may be caused to be in a closed state and when the pedestrian 1300a moves from a position farther than the reference surface 1300b to a position closer than the reference surface 1300b, the door unit 1303 may be caused to be in an open state.

Further, the door unit 1303 may be opened when the pedestrian 1300a continues to stay at a position closer than the reference surface 1300b for a predetermined period of time, and the door unit 1303 may be closed when the pedestrian 1300a continues to stay at a position farther than the reference surface 1300b for a predetermined period of time While the pedestrian 1300a continues to stay at a position closer than the reference surface 1300b, the opened state of the door unit 1303 may be maintained. While the pedestrian 1300a continues to stay at a position farther than the reference surface 1300b, the closed state of the door unit 1303 may be maintained.

According to the automatic door system 1300 as described above, not only a sensor (sensor for detecting the presence of a person) provided in the door unit 1303

(automatic door) but also three-dimensional information about a person existing around the door unit 1303 output from the imaging apparatus 100 are used, so that the convenience of the user of the automatic door can be improved. For example, when the transition of the distance of the person heading toward the door unit 1303 is monitored and it is determined that the speed of the person is faster than a predetermined speed (i.e., the person is running and approaching the door unit 1303), it is possible to make the door unit 1303 open before the presence of a person is detected by the above sensor. With this configuration, it is possible to prevent a person from colliding with the door unit 1303. The imaging apparatus 100 in this case may be used to monitor a person passing through an automatic door (door unit 1303).

Second Embodiment

Subsequently, the second embodiment will be explained. The hardware configuration and the functional configuration of the imaging apparatus according to the present embodiment are the same as those of the first embodiment described above, so the imaging apparatus according to the present embodiment will be explained as necessary with reference to FIGS. 1 and 4. In the following description, the detailed description about the same parts as in the first embodiment will be omitted, and the parts different from the first embodiment will be mainly described.

The present embodiment differs from the first embodiment described above in the shape and arrangement of the filter regions 11 to 14 included in the filter 10.

An example of the filter 10 provided in the opening portion of the imaging apparatus 100 according to the present embodiment will be described below with reference to FIG. 29.

Like the first embodiment described above, the filter 10 in the present embodiment is a color filter, and the filter 10 transmits light of a specific wavelength band. In the present embodiment, the first to fourth filter regions 11 to 14 are arranged as shown in FIG. 29.

More specifically, the first to fourth filter regions 11 to 14 are formed by a line that divides the filter 10 into two and passes through two points on the outer edge of a closed region which is a part of the filter 10. In other words, (a region of) the filter 10 is divided into four regions (first to fourth filter regions 11 to 14) by a line (first line) 10i formed to include a certain range of regions on the filter 10 and a line (second line) 10j passing through two points on the first line 10i and intersecting the outer periphery (outer edge) of the filter 10.

Figure 29:
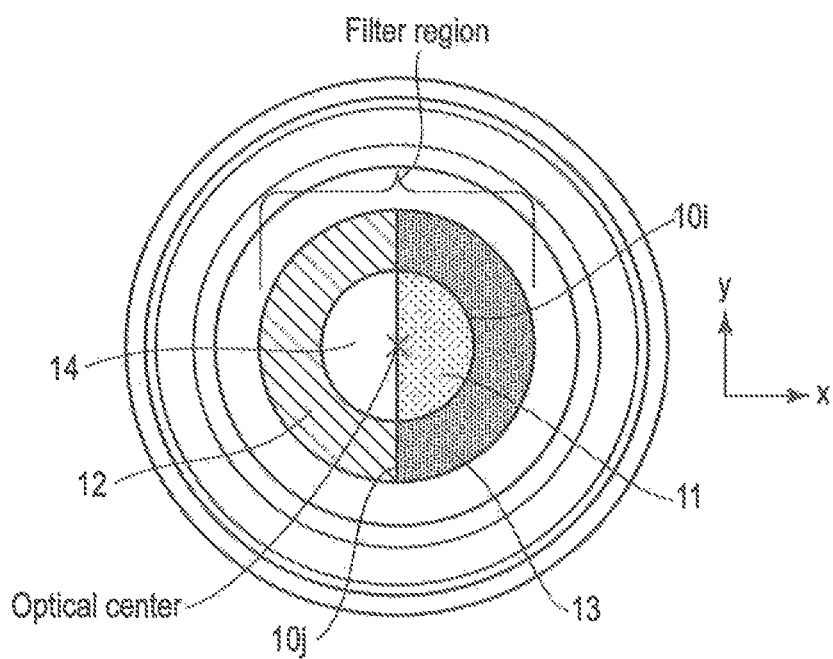

In the example shown in FIG. 29, the above-mentioned closed region is a circle, and the first line 10i is formed to include a circular region of which center is at the center of the filter 10. The second line 10j contains a straight line that passes through the center of the circular region enclosed by the first line 10i (i.e., it divides the closed region which is a circle).

In the following description, the circular region encompassed by the first line 10i will be referred to as an inner region, and the region between the outer periphery of the filter 10 and the first line 10i will be referred to as an outer region.

In the present embodiment, the first filter region 11 and the fourth filter region 14 are arranged at positions adjacent to each other in the inner region (facing each other). The second filter region 12 and the third filter region 13 are arranged at positions adjacent to each other in the outer region. The first filter region 11 and the third filter region 13 are arranged so as to be in contact with each other, and the second filter region 12 and the fourth filter region 14 are arranged to be in contact with each other. More specifically, as shown in FIG. 29, the filter 10 according to the present embodiment is configured such that the first filter region 11 is placed on the right side of the inner region, the second filter region 12 is placed on the left side of the outer region, the third filter region 13 is placed on the right side of the outer region, and the fourth filter region 14 is placed on the left side of the inner region.

The first filter region 11 is made of a "yellow filter" that transmits the light of the red wavelength region and the light of the green wavelength region.

The second filter region 12 is made of a "cyan filter" that transmits the light of the green wavelength region and the light of the blue wavelength region.

The third filter region 13 is made of a "green filter" that transmits the light of the green wavelength region.

The fourth filter region 14 is made of a "transparent filter" that transmits the light of the red wavelength region, the light of the green wavelength region, and the light of the blue wavelength region.

More specifically, the transmittance characteristics of the first to fourth filter regions 11 to 14 are different like the first embodiment described above.

In the present embodiment, according to such transmittance characteristics, the first filter region 11 and the fourth filter region 14 (i.e., inner region) transmits the light of the red wavelength region. The second filter region 12 and the fourth filter region 14 (i.e., the region of the left half of the filter 10) transmit the light of the blue wavelength region. Further, the first to fourth filter regions 11 to 14 transmit the light of the green wavelength region.

As described in the above first embodiment, "to transmit" means that the light of the corresponding wavelength region is transmitted with a high transmittance and the attenuation (more specifically, a decrease in the amount of lights of the light of the wavelength region is extremely small.

Subsequently, the processing procedure of the imaging apparatus 100 according to the present embodiment will be described. In this case, for the sake of convenience, the processing procedure of the imaging apparatus 100 will be described with reference to the flowchart of FIG. 5 described above.

First, when the imaging of the object by the imaging apparatus 100 is started, the light transmitted through the filter 10 and the lens 20 provided in the imaging apparatus 100 reaches the image sensor 30.

In this case, the first sensor 31 (sensor R) included in the image sensor 30 detects (receives) the light of the red wavelength region from the light transmitted through the first filter region 11 and the fourth filter region 14 and generates an image R (step S1). The image R generated in this step S1 is an image changed as compared with the reference image and the like.

Figure 30:
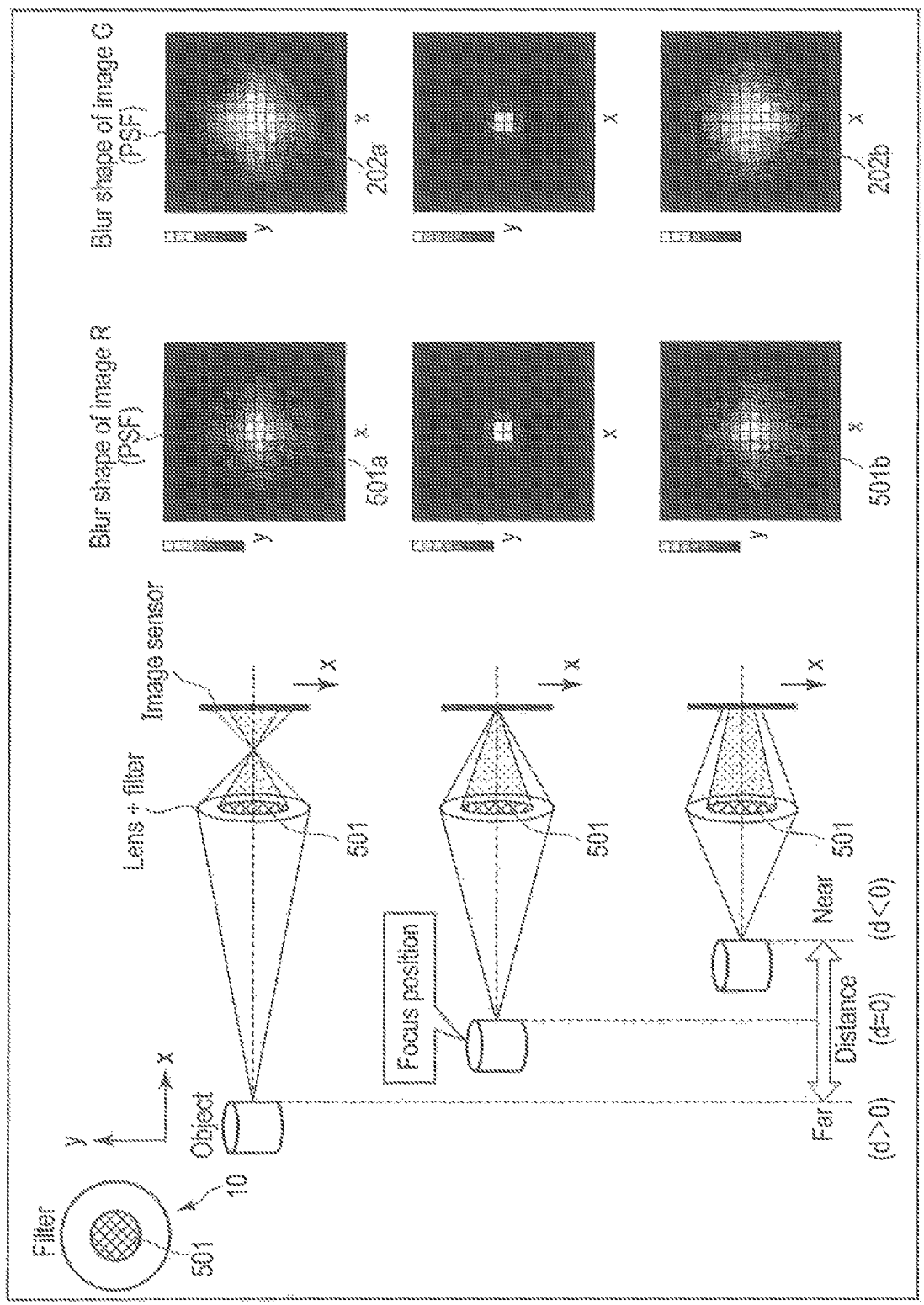
FIG. 30 is a diagram for conceptually explaining the image R generated by the first sensor.

Hereinafter, the image R generated by the first sensor 31 will be conceptually explained with reference to FIG. 30. The blur shape of the image G shown in FIG. 30 is similar to that described in FIG. 5 and the like, so a detailed description thereof will be omitted.

As described above, the filter 10 provided in the opening portion of the imaging apparatus 100 includes the first to fourth filter regions 11 to 14 with different transmittance characteristics, and in the following explanation, for the sake of convenience, of the first to fourth filter regions 11 to 14, the region including the first filter region 11 and the fourth filter region 14 that transmits the light of the red wavelength region (i.e., the inner region of the filter 10) will be referred to as a filter R region 501. The right column and the middle column of FIG. 30 show the blur shapes of the images formed on the image sensor 30. The left column of FIG. 30 shows the combination of the lens 20 and the filter 10 and the image sensor 30 when the imaging apparatus 100 is seen from the upper direction (i.e., the positive direction of the Y axis).

First, suppose a case where the position of object is farther than the focus position, i.e., the distance d>0. In this case, the object is out of focus, and therefore, blurring occurs in the image R.

As described above, the image R is an image generated based on the light transmitted through the filter R region (the region on the left half of the filter 10) 501. Therefore, as shown in the upper part of FIG. 30, for example, the blur shape of the image R (hereinafter simply referred to as a blur shape) 501a when the distance d>0 holds is a shape obtained by reducing the blur shape 202a as compared with a blur shape 202a of the image G.

More specifically, the blur shape of the image R 501a has a point symmetrical shape according to the shape (size) of the filter R region 501.

Subsequently, it is assumed that the position of object matches the focus position, i.e., the distance d=0. As shown in the middle part of FIG. 30, blurring does not occur in the image R in this case.

Further, it is assumed that the position of the object is closer than the focus position, i.e., the distance d<0. In this case, the object is out of focus, and therefore, blurring occurs in the image R.

As described above, the image R is an image generated based on the light transmitted through the filter R region 501. For example, in the case where the distance d<0 holds, the blur shape of the image R 501b has a shape obtained by reducing the blur shape 202b as compared with the blur shape 202b of the image G. The shape of the blur shape 501b is the same as the blur shape 501a described above.

Back to FIG. 5 again, the second sensor 32 (sensor G) included in the image sensor 30 detects (receives) the light of the green wavelength region from the lights transmitted through the first to fourth filter regions 11 to 14 and generates an image G (step S2).

Since the light of the green wavelength region transmits all the filter regions as described above, the image G is an image close to the reference image.

Subsequently, the third sensor 33 (sensor B) included in the image sensor 30 detects (receives) the light of the blue wavelength region from the light transmitted through the second filter region 12 and the fourth filter region 14 and generates an image B (step S3). The image B generated in this step S3 is an image changed as compared with the reference image and the like.

Hereinafter, the image B generated by the third sensor 33 will be conceptually described with reference to FIG. 31. The blur shape of image G shown in FIG. 31 is similar to that of FIG. 30, so its detailed explanation will be omitted.

As described above, the filter 10 provided in the opening portion of the imaging apparatus 100 includes first to fourth filter regions 11 to 14 with different transmittance characteristics, and in the following explanation, of the first to fourth filter regions 11 to 14, the region including the second filter region 12 and the fourth filter region 14 transmitting the light of the blue wavelength region (i.e., the region at the left half of the filter 10 as seen from the object side captured by imaging apparatus 100) will be referred to as a filter B region 502 for the sake of convenience. The right column and the middle row of FIG. 31 show the blur shape of the image formed on the image sensor 30. The left column of FIG. 24 shows the combination of the lens 20 and the filter 10 and the image sensor 30 when the imaging apparatus 100 is seen from the upper direction (i.e., the positive direction of the Y axis).

First, it is assumed that the position of the object is farther than the focus position, i.e., the distance d>0. In this case, the object is out of focus, and therefore, blurring occurs in the image B.

As described above, the image B is an image generated based on the light transmitted through the filter B region (the region of the left half region of the filter 10) 502. Therefore, for example, the blur shape of the image B 502a in the case of distance d>0 holds has a shape deviating to the right side as compared with the blur shape 202a of the image G.

More specifically, the blur shape of the image B 502a is a non-point symmetrical symmetric shape (a shape deviating to the right side) according to the shape of the filter B region 203.

Subsequently, it is assumed that the position of object matches the focus position, i.e., the distance d=0. As shown in the middle part of FIG. 31, blurring does not occur in the image B in this case.

Further, it is assumed that the position of object is closer than the focus position, i.e., the distance d<0. In this case, the object is out of focus, and therefore, blurring occurs in the image B.

As described above, the image B is an image generated based on the light transmitted through the filter B region 502. For example, the blur shape of the image B 502b in the case of the distance d<0 holds has a shape deviating to the left side as compared with the blur shape 202b of the image G.

More specifically, like the blur shape 502a described above, the blur shape 502b has a non-point symmetrical shape according to the shape of the filter B region 502, and has a shape in which the blur shape 502a inverted around the straight line parallel to the Y axis direction.

As described above, in the image R and the image B, the blur shape changes according to the distance d. More specifically, the blur shape of the image R is changed to a shape (point symmetric shape) obtained by reducing the blur shape of the image G in a case where the distance d>0 and the distance d<0 hold (i.e., the case other than the distance d=0 holds). On the other hand, where the distance d>0 holds, the blur shape of the image B is changed to a shape like a semicircle where the left side of blur shape of G is missing (non-point symmetrical shape), and where the distance d<0 holds, the blur shape of the image B is changed to an shape like a semicircle where the right side of blur shape of G is missing (non-point symmetrical shape).

Although not shown in FIGS. 30 and 31, the size (width) of the blur shape in the image R, the image G, and the image B depends on distance |d| as explained in the above first embodiment.

Back to FIG. 5 again, the image R generated in step S1, the image G generated in step S2, and the image B generated in the step S3 explained above are input by the input module 111 included in the image processor 110.

The distance calculation module 112 calculates an object distance based on the image R, the image G, and the image B input by the input module 111 (step S4).

In step S4, for example, like the first embodiment described above, the object distance is calculated for each pixel constituting the captured image by comparing the blur shapes of the image R and the image B with the blur shape of the image G which change according to the distance d from the focus position to the object with respect to the image G close to the reference image serving as a reference.

In this case, where the image G is the reference image, and the image R or the image B where the blur shape is more greatly changed than the reference image are adopted as the target images, the distance calculation module 112 can calculate the object distance by correcting the blur shape of the target image by applying the correction filter corresponding to any given distance, and comparing the blur shape of the corrected target image with the blur shape of the reference image.

When the target image is the image R, a correction filter is applied to add blur around the blur shape of the image R (shape obtained by reducing the blur shape of image G). In this case, the blur shape of the image R can be corrected into a shape conforming to the blur shape of the image G by performing a convolution of a two dimensional correction filter on the blur shape of the image R. The processing after applying the correction filter to the blur shape of the image R is similar to that of the first embodiment described above, so a detailed description thereof will be omitted.

The filter B region 502 in the present embodiment and the filter R region 201 in the first embodiment described above are the same region in the filter 10. Therefore, when the target image is the image B in the present embodiment, it may be possible to execute processing similar to processing performed in the case of identifying the distance d (i.e., calculating the object distance) using the image R and the image G in the first embodiment described above.

When the object distance is calculated for each pixel in step S4, processing of step S5 is executed. Since the processing of step S5 is as described in the first embodiment, a detailed description thereof will be omitted.

As described above, in the present embodiment, the filter 10 that transmits incident light to image object is divided into four regions (the first to fourth filter regions 11 to 14) formed by a line that divides the filter 10 into two and passes through two points on the outer edge of a closed region which is a part of the filter 10. The transmittance characteristics of the four filter regions are different from each other.

More specifically, as shown in FIG. 29, the first line 10*i* is formed so as to include a circular region of which center is the center of the filter 10, and the second line 10*j* contains a straight line passing through the center of the circular region. The first line 10*i* and the second line 10*j* form the first to fourth filter regions 11 to 14.

In the present embodiment, since the object distance can be calculated from the captured image (the image R, the image B, and the image G) generated based on the incident light transmitted through the filter 10, the distance information can be obtained with high precision in a compact and low cost manner.

In this case, the blur shape of the image R according to the present embodiment is a shape (point symmetric shape) obtained by reducing the blur shape of the image G. The convolution direction for the blur shape of the image R is not limited to one direction unlike the image R and the image B in the first embodiment described above. Therefore, in the present embodiment, it is possible to calculate the object distance regardless of the edge direction.

In the present embodiment, since the convolution direction of the image B is the horizontal direction (left and right direction), the distance d for the edge portion of the horizontal direction cannot be calculated using the image B. In this case, the distance d can be calculated using the image R, but since the blur shape of the image R is point-symmetric shape, the blur shapes have the same shape regardless of whether the distance d>0 holds or the distance d<0 holds. More specifically, with the image R alone, it is possible to calculate distance |d|, but the distance d>0 and the distance d<0 cannot be distinguished from each other. In contrast, since it is unlikely that the plus and minus of the distance d will be reversed only for (a portion corresponding to) a particular pixel with respect to neighboring pixels, for example, the distance d>0 or the distance d<0 of the particular pixel may be distinguished from each other based on the distance d (object distance) calculated for the neighboring pixel.

Further, in the present embodiment, for example, the size of the inner region (the diameter of the inner region) included by the first line 10*i* can be adjusted based on the spectral sensitivity of the image sensor 30 and the like, and therefore, the degree of flexibility in the design of the first to fourth filter regions 11 to 14 included in the filter 10 is high, and it is easy to control the robustness against illumination change and the like.

The arrangement of the first to fourth filter regions 11 to 14 (i.e., the configuration of the filter 10) shown in FIG. 29 is an example, and, for example, as described above, the filter 10 may be such that the first to fourth filter regions 11 to 14 are arranged so that the blur shape of the image R (filter R region 501) is a point symmetrical shape, and the blur shape of the image B (filter B region 502) is a non-point symmetrical shape. For example, the first filter region 11 and the fourth filter region 14 may be interchanged, and the second filter region 12 and the third filter region 13 may be interchanged.

Figure 32:
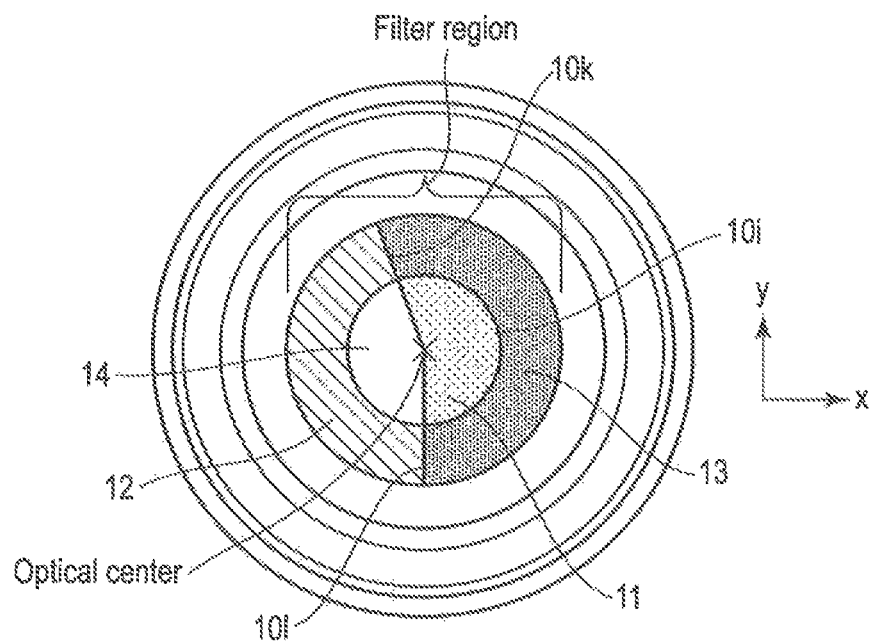
FIG. 32 is a diagram showing another arrangement example of the first to fourth filter regions.

In the present embodiment, the filter 10 is divided into four filter regions by the first line 10*i* and the second line 10*j* shown in FIG. 29. For example, as shown in FIG. 32, the filter 10 may be divided by the first line 10*i* and two or more second lines (for example, second line 10*k* and 10*l*).

Figure 33:
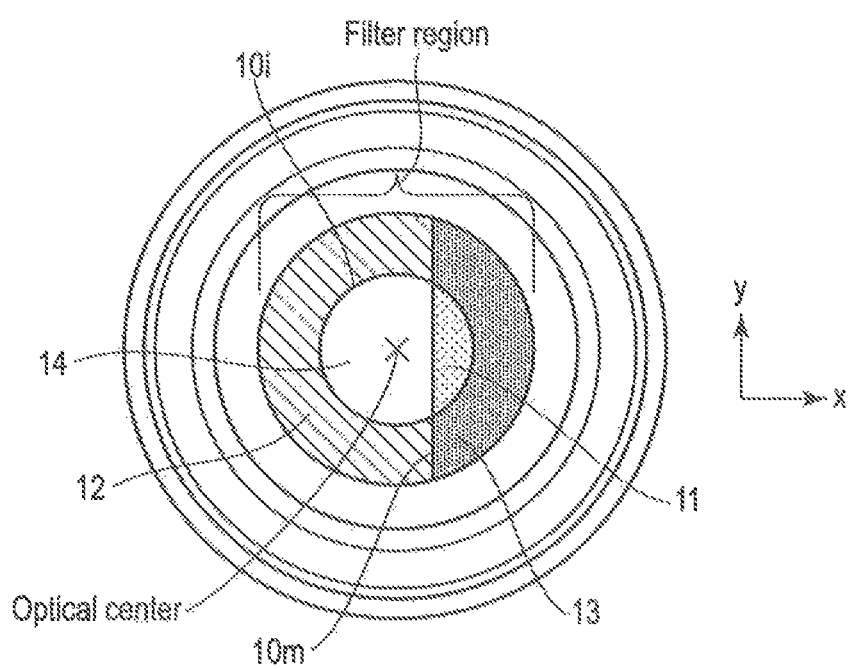
FIG. 33 is a diagram showing still another arrangement example of the first to fourth filter regions.

For example, as in the second line 10*m* shown in FIG. 33, the second line does not need to pass through the center of the filter 10. Further, although not shown, for example, the first line may include a plurality of straight lines so that the inner region has a rectangular shape. The second line may be a curved line.

In the present embodiment, the filter 10 is divided into four filter regions, but there may be five or more filter regions as long as the filter R region and filter B region is arranged so that the blur shape of the image R is a shape obtained by reducing the blur shape of the image G (point symmetrical shape), and the blur shape of the image B is a non-point symmetrical shape, and all of the filter regions included in filter 10 are configured to transmit light of the green wavelength region. As described in the above first embodiment, if it is possible to generate a reference image corresponding to image G, at least one filter region included in the filter 10 may be configured not to transmit the light of the green wavelength region.

In this case, in the present embodiment, the color (common color) of the light of the wavelength region that transmit all of the first to fourth filter regions 11 to 14 included in the filter 10 is green. However, in a case where the common color is green, the filter 10 may be configured so that, in the present embodiment described above, the filter R region 501 is a filter B region and the filter B region 502 is a filter R region. More specifically, the first filter region 11 may be a "cyan filter", and the second filter region 12 may be a "yellow filter", the third filter region 13 may be a "green filter", and the fourth filter region 14 may be a "transparent filter". According to such configuration, the inner region (the first filter region 11 and the fourth filter region 14) of the filter 10 is the filter B region, and the region of the left half of the filter 10 (the second filter region 12 and the fourth filter region 14) is the filter R region. Even in this case, the object distance can be calculated by comparing the image B (target image) and the image G (reference image) and comparing the image R (target image) and the image G (reference image).

The common color is not limited to green. For example, a filter 10 in which red is adopted as common color can be used in a case where the first filter region 11 is a "magenta filter", the second filter region 12 is a "yellow filter", the third filter region 13 is a "red filter", and the fourth filter region 14 is a "transparent filter". According to such configuration, the inner region of the filter 10 becomes the filter B region, and the region of the left half of the filter 10 is the filter G region (region through which the light of the green wavelength region passes). In another example of a filter 10 in which red is adopted as common color, the first filter region 11 is a "yellow filter", the second filter region 12 is a "magenta filter", the third filter region 13 is a "red filter", and the fourth filter region 14 is a "transparent filter". According to such configuration, the inner region of the filter 10 becomes the filter G region, and the region of the left half of the filter 10 becomes the filter B region. In a case where the common color is red, the object distance can be calculated by comparing the image G (target image) and the image R (reference image), and comparing the image B (target image) and the image R (reference image).

Further, for example, a filter 10 in which blue is adopted as common color can be used in a case where the first filter region 11 is a "magenta filter", the second filter region 12 is a "cyan filter", the third filter region 13 is a "blue filter", and the fourth filter region 14 is a "transparent filter". According to such configuration, the inner region of the filter 10 becomes the filter R region, and the region on the left half of the filter 10 becomes the filter G region. In another example of a filter 10 in which blue is adopted as common color, the first filter region 11 may be a "cyan filter", the second filter region 12 may be a "magenta filter", the third filter region 13 may be a "blue filter", and the fourth filter region 14 may be a "transparent filter". According to such configuration, the inner region of filter 10 becomes the filter G region, and the region of the left half of filter 10 becomes the filter R region. In a case where the common color is blue, the object distance can be calculated by comparing the image R (target image) and the image B (reference image), and comparing the image G (target image) and the image B (reference image).

Like the first embodiment explained above, according to the imaging apparatus 100 of the present embodiment can also obtain three-dimensional information about a space. Therefore, the imaging apparatus 100 of the present embodiment may be used for (applied to) the above-mentioned monitor system, the above-mentioned automatic control system, and the like.

According to at least one embodiment described above, it is possible to provide an imaging apparatus and an automatic control system which can obtain distance information with high accuracy with at small size at a low cost.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An imaging apparatus comprising:
   a filter configured to transmit light;
   an image sensor configured to generate an image according to the light that has been transmitted by the filter,
   wherein the filter comprises:
      a first filter region which transmits light of a first wavelength region, and does not transmit light of a second wavelength region of which wavelength is different from that of the first wavelength region;
      a second filter region which does not transmit the light of the first wavelength region and transmits the light of the second wavelength region;
      a third filter region which does not transmit the light of the first wavelength region and does not transmit the light of the second wavelength region; and
      a fourth filter region which transmits the light of the first wavelength region and transmits the light of the second wavelength region,
      wherein the four filter regions do not overlap each other; and
   a processor configured to calculate a distance to the object by a first blur shape of the first image or a second blur shape of the second image and a third blur shape of a third image generated by the image sensor based on a third wavelength region.

2. The imaging apparatus according to claim 1, wherein the first to fourth filter regions are formed by an outer edge of the filter and at least two lines at an inside of the outer edge and intersecting each other.

3. The imaging apparatus according to claim 2, wherein the first filter region is arranged adjacent to the fourth filter region and the second filter region is arranged adjacent to the fourth filter region.

4. The imaging apparatus according to claim 1, wherein the filter includes first to fourth filter regions formed by a closed region which is a part of the filter and a line passing through two points on an outer edge of the closed region and dividing the filter into two.

5. The imaging apparatus according to claim 4, wherein the closed region is a circle and the line divides the circle into two.

6. The imaging apparatus according to claim 1, wherein the first to fourth filter regions transmit the third wavelength region of which wavelength is different from the first wavelength region and the second wavelength region.

7. The imaging apparatus according to claim 6, wherein the image sensor is configured to receive light in red, green, and blue wavelength regions,
   the first wavelength region includes a red wavelength region,
   the second wavelength region includes a blue wavelength region, and
   the third wavelength region includes a green wavelength region.

8. The imaging apparatus according to claim 1, wherein the first blur shape and the second blur shape are a non-point symmetrical shape, and the third blur shape is a point symmetrical shape.

9. The imaging apparatus according to claim 8, wherein the processor is configured to output an image processed based on distance information indicating the distance calculated.

10. The imaging apparatus according to claim 8, wherein a shape or arrangement of the first to fourth filter regions are determined based on a hardware constraint of the imaging apparatus used to calculate the distance to the object.

11. The imaging apparatus according to claim 8, wherein a shape or arrangement of the first to fourth filter regions are determined such that the direction in which the first blur is added to the first blur shape is different from a direction of an edge in the first image and the direction in which the second blur is added to the second blur shape is different from a direction of an edge in the second image.

12. The imaging apparatus according to claim 8, wherein a shape or the arrangement of the first to fourth filter regions are defined such that one of the direction in which the first blur is added to the first blur shape and the direction in which the second blur is added to the second blur shape is horizontal.

13. The imaging apparatus according to claim 8, wherein a shape or arrangement of the first to fourth filter regions are defined such that the direction in which the first blur is added to the first blur shape and the direction in which the second blur is added to the second blur shape are perpendicular to each other.

14. The imaging apparatus according to claim 1, wherein the processor is configured to calculate the distance to the object imaged by the imaging apparatus based on a parallax amount between the first image generated by the image sensor based on the first wavelength region having been transmitted by the first and fourth filter regions and the second image generated by the image sensor based on the second wavelength region having been transmitted by the second and fourth filter regions.

15. An automatic control system comprising:
the imaging apparatus according to claim 1; and
controller configured to control a movement of a mobile object based on an image generated in the imaging apparatus.

16. The imaging apparatus according to claim 1, wherein the image sensor is configured to generate a first blur shape of a first image based on the light of the first wavelength region that has been transmitted by the first and fourth filter regions and a second blur shape of a second image based on the light of the second wavelength region that has been transmitted by the second and fourth filter regions, the first blur shape of the first image and the second blur shape of the second image being different from each other,
the first blur shape of the first image and the second blur shape of the second image are non-point symmetrical shapes, and
a direction in which a first blur is added to the first blur shape is different from a direction in which a second blur is added to the second blur shape.

17. An imaging apparatus comprising:
a filter configured to transmit incident light; and
an image sensor configured to generate an image according to the light that has been transmitted by the filter,
wherein:
the filter comprises four non-overlapping filter regions formed by a closed region which is a part of the filter and a line passing through two points on an outer edge of the closed region and dividing the filter into two, and the transmittance characteristics of the four filter regions are different from each other,
the image sensor is configured to generate a first blur shape of a first image based on light of a first wavelength region and a second blur shape of a second image based on light of a second wavelength region, the first blur shape and the second blur shape being different from each other,
the first blur shape of the first image and the second blur shape of the second image are non-point symmetrical shapes, and
a direction in which first blur is added to the first blur shape is different from a direction in which second blur is added to the second blur shape.

* * * * *